(12) United States Patent
Mizuochi et al.

(10) Patent No.: US 11,588,967 B2
(45) Date of Patent: Feb. 21, 2023

(54) IMAGING APPARATUS, LENS APPARATUS, ACCESSORY, AND CAMERA SYSTEM WITH CONTACT GROUPS AND POWER CONTACTS ARRAYED IN AN ORDER

(71) Applicant: CANON KABUSHIKI KAISHA, Tokyo (JP)

(72) Inventors: Fuya Mizuochi, Saitama (JP); Toru Ohara, Tochigi (JP); Yasuyuki Watazawa, Tokyo (JP); Naoto Fujihashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/184,435

(22) Filed: Feb. 24, 2021

(65) Prior Publication Data

US 2021/0185219 A1 Jun. 17, 2021

Related U.S. Application Data

(63) Continuation of application No. PCT/JP2018/032131, filed on Aug. 30, 2018.

(51) Int. Cl.
H04N 5/335 (2011.01)
H04N 5/232 (2006.01)
G03B 17/14 (2021.01)
H04N 5/225 (2006.01)

(52) U.S. Cl.
CPC ......... *H04N 5/23209* (2013.01); *G03B 17/14* (2013.01); *H04N 5/2254* (2013.01)

(58) Field of Classification Search
CPC ........................... H04N 5/23209; G03B 17/14
See application file for complete search history.

(56) References Cited

U.S. PATENT DOCUMENTS

| | | | | |
|---|---|---|---|---|
| 4,974,004 A | * | 11/1990 | Kawasaki | G03B 17/14 396/529 |
| 4,999,659 A | * | 3/1991 | Fukahori | G03B 17/14 396/532 |
| 5,021,812 A | * | 6/1991 | Kohno | G03B 17/14 396/532 |
| 5,079,578 A | * | 1/1992 | Kohno | G03B 7/20 348/223.1 |
| 5,359,379 A | * | 10/1994 | Kohno | G03B 7/20 396/80 |
| 10,602,038 B2 | * | 3/2020 | Mizuochi | H04N 5/06 |
| 10,992,846 B2 | * | 4/2021 | Mizuochi | H04N 5/2253 |
| 2007/0077063 A1 | * | 4/2007 | Tokiwa | G03B 17/14 396/532 |

(Continued)

FOREIGN PATENT DOCUMENTS

JP S63172257 A 7/1988
JP 2012-078770 A 4/2012
(Continued)

*Primary Examiner* — Gary C Vieaux

(74) *Attorney, Agent, or Firm* — Canon U.S.A., Inc. I.P. Division

(57) ABSTRACT

A camera body includes a plurality of electric contacts in a first set and a second set. When a lens apparatus is mounted to the camera body, the first set of the electric contacts comes into contact with an electric contact disposed on the lens apparatus before coming into contact with the second set of electric contacts.

20 Claims, 15 Drawing Sheets

(56) References Cited

U.S. PATENT DOCUMENTS

2013/0077954 A1* 3/2013 Oikawa ................. G03B 17/14
                                                    396/530
2018/0224722 A1* 8/2018 Pan ...................... G03B 17/14
2018/0352122 A1* 12/2018 Yasuda .................. G03B 7/20

FOREIGN PATENT DOCUMENTS

| JP | 2013-232015 A | 11/2013 |
| JP | 2017-134430 A | 8/2017 |
| JP | 2017134430 A * | 8/2017 |

* cited by examiner

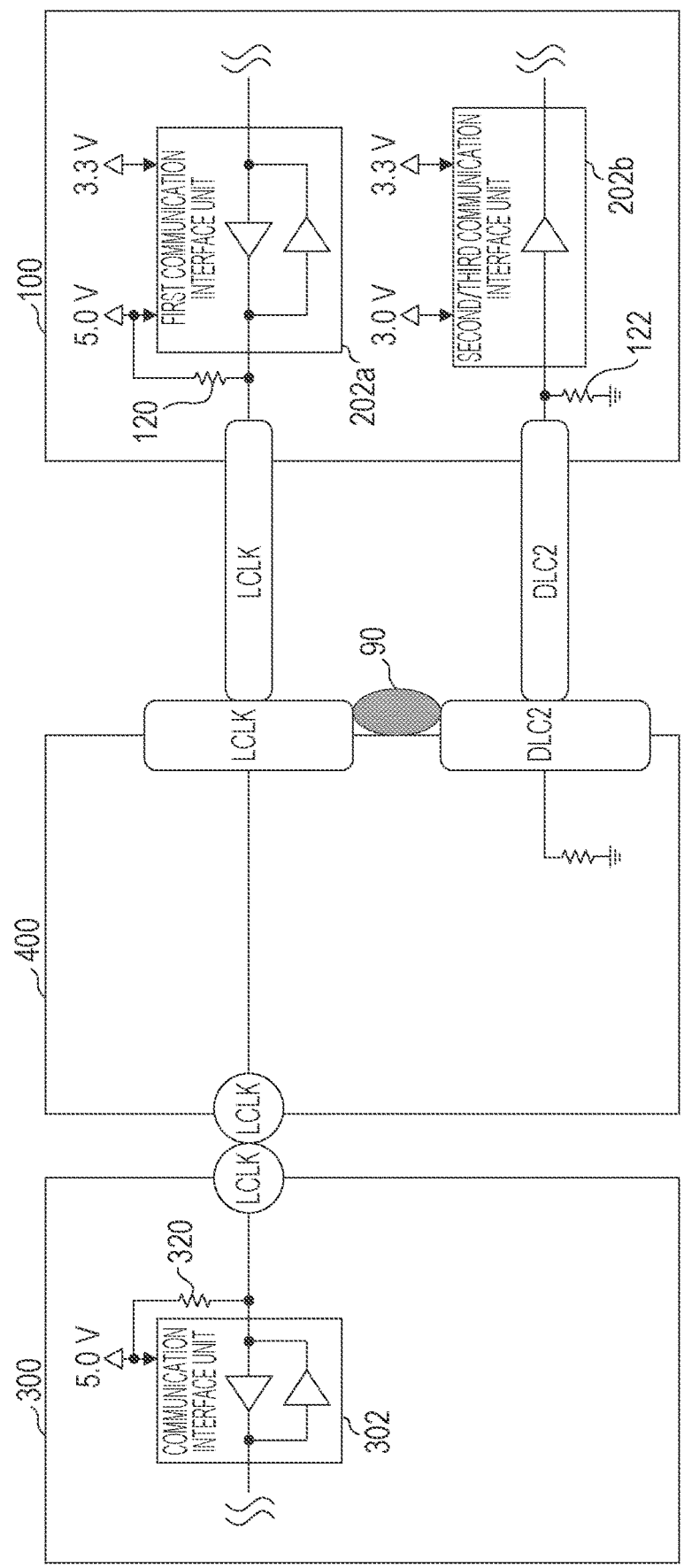

IMAGING APPARATUS, LENS APPARATUS, ACCESSORY, AND CAMERA SYSTEM WITH CONTACT GROUPS AND POWER CONTACTS ARRAYED IN AN ORDER

CROSS-REFERENCE TO RELATED APPLICATIONS

This application is a Continuation of International Patent Application No. PCT/JP2018/032131 filed Aug. 30, 2018, which is hereby incorporated by reference herein in their entirety.

BACKGROUND OF THE INVENTION

Field of the Invention

The present invention relates to an imaging apparatus, a lens apparatus, and an accessory, that are capable of communicating with each other.

Background Art

Accessory devices, such as lens apparatuses that are detachably mountable to an imaging apparatus, operate by receiving power supplied from the imaging apparatus, communicating with the imaging apparatus, and so forth. For the operation, multiple electric contacts are provided both on a mount unit of the imaging apparatus and a mount unit of an accessory device. When an accessory device is mounted to the imaging apparatus, the electric contacts on the camera body and the electric contacts on the accessory device come into contact with each other, and the imaging apparatus and the accessory device are electrically connected.

Patent Literature (PTL) 1 describes an imaging apparatus and a lens apparatus each having two electric contact groups capable of performing communication that is different from each other.

Generally, a lens apparatus and an imaging apparatus are coupled by bayonet coupling. Accordingly, when the lens apparatus is mounted to the imaging apparatus, the electric contacts on the imaging apparatus slide over the electric contacts on the lens apparatus, and the electric contacts are worn by the sliding. Such wear of the electric contacts can cause problems in communication between the imaging apparatus and the lens apparatus.

Since the amount of wear of electric contacts differs depending on positions, it is preferable to arrange the order of the electric contacts in an array in accordance with the role of each electric contact in communication, in a case where multiple electric contacts are provided to perform communication with a lens apparatus by multiple communication methods as discussed in the imaging apparatus described in PTL1.

CITATION LIST

Patent Literature

PTL1: Japanese Patent Laid-Open No. 2012-078770

SUMMARY OF THE INVENTION

The present invention is directed to reducing an occurrence of a communication failure due to wear of electric contacts in an imaging apparatus.

An imaging apparatus according to the present invention to which a lens apparatus is detachably mountable, wherein the imaging apparatus includes a mount unit on which a plurality of electric contacts is arranged, the mount unit includes a bayonet claw that is bayonet-coupled with a mount unit on a lens apparatus, the plurality of electric contacts includes a first electric contact group that is used for a first communication with a lens apparatus mounted to the imaging apparatus, and a second electric contact group that is used for a communication different from the first communication with a lens apparatus mounted to the imaging apparatus, the imaging apparatus is capable of mounting a first lens apparatus that is configured to perform a communication using the first electric contact group and not configured to perform a communication using the second electric contact group, and a second lens apparatus that is configured to perform a communication using the first electric contact group and to perform a communication using the second electric contact group, and where a direction of movement of a lens apparatus with respect to the imaging apparatus when a lens apparatus is mounted to the imaging apparatus is a first direction, the second electric contact group and the first electric contact group are arranged in the order of the second electric contact group and the first electric contact group in the first direction.

An imaging apparatus according to the present invention to which a lens apparatus is detachably mountable, wherein the imaging apparatus includes a mount unit on which a plurality of electric contacts is arranged, the mount unit includes a bayonet claw that is bayonet-coupled with a mount unit on a lens apparatus, the plurality of electric contacts includes a first electric contact group that is used for a first communication with a lens apparatus mounted to the imaging apparatus, and a second electric contact group that is used for a communication different from the first communication with a lens apparatus mounted to the imaging apparatus, the imaging apparatus is capable of mounting a first lens apparatus that is configured to perform a communication using the first electric contact group and not configured to perform a communication using the second electric contact group, and a second lens apparatus that is configured to perform a communication using the first electric contact group and to perform a communication using the second electric contact group, and the plurality of electric contacts are arranged in such a manner that, when the second lens apparatus is mounted to the imaging apparatus, the second electric contact group comes into contact with an electric contact on the second lens apparatus before the first electric contact group comes into contact with an electric contact on the second lens apparatus.

An imaging apparatus according to the present invention to which a lens apparatus is detachably mountable, wherein the imaging apparatus includes a mount unit on which a plurality of electric contacts is arranged, the plurality of electric contacts includes a first electric contact configured to output a clock signal, a second electric contact configured to transmit data to the lens apparatus synchronously with the clock signal, a third electric contact configured to receive data transmitted from the lens apparatus synchronously with the clock signal, and a fourth electric contact configured to receive data transmitted from the lens apparatus in accordance with data transmitted from the second electric contact, the mount unit includes a bayonet claw that is bayonet-coupled with a mount unit on a lens apparatus, and the plurality of electric contacts are arranged in such a manner that, when the lens apparatus is mounted to the imaging apparatus, the fourth electric contact comes into contact with an electric contact on the lens apparatus before any one of the first through third electric contacts comes into contact with an electric contact on the lens apparatus.

Further features of the present invention will become apparent from the following description of exemplary embodiments with reference to the attached drawings.

BRIEF DESCRIPTION OF THE DRAWINGS

FIG. 13C is a diagram describing a case where the LCLK terminal and a terminal adjacent to the LCLK terminal are short-circuited.

DESCRIPTION OF THE EMBODIMENTS

Various types of terminology in the specification of the present application will be described prior to the description relating to embodiments of the present invention.

An accessory apparatus (accessory) refers to a device that is mountable to an imaging apparatus. The imaging apparatus and the accessory device are engaged with each other by coupling mount units on the imaging apparatus and the accessory device. Examples of the accessory device include lens apparatuses (lens devices) having an image capturing optical system. Examples of the accessory device also include an intermediate accessory that is mounted between a lens apparatus and the imaging apparatus body.

A mount unit is a coupling unit provided to each of the imaging apparatus and the accessory device. The mount unit of the imaging apparatus and the mount unit of the accessory device each have electric contacts, and the electric contacts on the respective mount units come into contact when the accessory device is mounted to the imaging apparatus. That is to say, the mount units not only serve to mechanically couple the imaging apparatus body and the accessory device, but also to electrically connect the imaging apparatus body and the accessory device.

Figure 1:
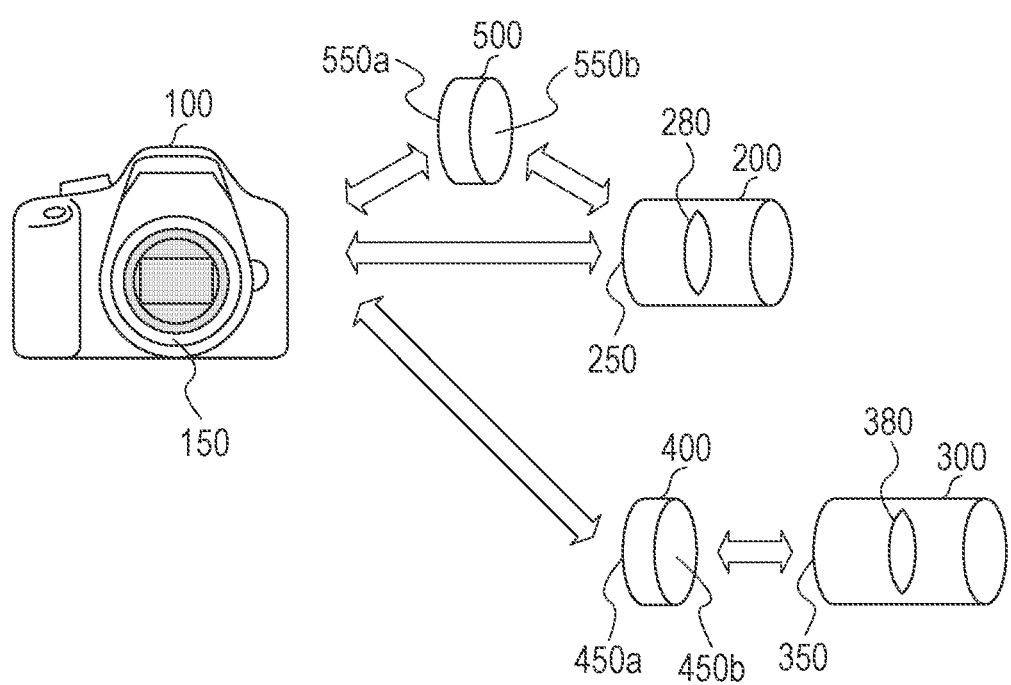
FIG. 1 is a diagram describing the mutual relation between an imaging apparatus, a lens apparatus, and an intermediate accessory device.

Next, the mutual relation between the imaging apparatus, the lens apparatus, and the intermediate accessory device according to an embodiment will be described with reference to FIG. 1. FIG. 1 illustrates the mutual relation among a camera body 100 serving as the imaging apparatus according to the present embodiment, a lens apparatus 200 according to the present embodiment, intermediate accessory devices 400 and 500 according to the present embodiment, and a lens apparatus 300 according to a conventional arrangement having a different configuration from the lens apparatus 200 according to the present embodiment. The devices indicated with arrows in FIG. 1 can be mounted to each other by coupling the respective mount units. The lens apparatus 200 has an image capturing optical system 280, and the lens apparatus 300 has an image capturing optical system 380. The camera body 100 has an imaging device, such as a complementary metal-oxide semiconductor (CMOS) sensor, charge-coupled device (CCD) sensor, or the like. The lens apparatus 200 or the lens apparatus 300 is mounted on the camera body 100 so that image capturing of a subject can be performed.

The lens apparatus 200, the intermediate accessory device 500, and the intermediate accessory device 400 can be directly mounted to the camera body 100. That is to say, a mount unit 250 of the lens apparatus 200, a mount unit 550a of the intermediate accessory device 500, and a mount unit 450a of the intermediate accessory device 400, have shapes that can be coupled to a mount unit 150 of the camera body 100.

The intermediate accessory device 500 also has, besides the mount unit 550a serving as a first accessory mount unit mountable to the camera body 100, a mount unit 550b serving as a second accessory mount unit that has the same shape as the mount unit 150 of the camera body 100. Accordingly, the lens apparatus 200 can be mounted to the intermediate accessory device 500 as well. In other words, the lens apparatus 200 can be mounted to the camera body 100 via the intermediate accessory device 500. Another intermediate accessory device (omitted from illustration) may be mounted between the lens apparatus 200 and the intermediate accessory device 500. In this case, two intermediate accessory devices will be mounted between the lens apparatus 200 and the camera body 100.

Meanwhile, the mount unit 150 has a shape not capable of being coupled to a mount unit 350 of the lens apparatus 300. Accordingly, the lens apparatus 300 cannot be directly mounted to the camera body 100. However, the lens apparatus 300 can be mounted to the camera body 100 via the intermediate accessory device 400 that has the mount unit (first accessory mount unit) 450a and the mount unit (second accessory mount unit) 450b that can be mounted to the lens apparatus 300.

Thus, any of multiple lens apparatuses including the lens apparatus 200 and lens apparatus 300 are selectively mounted to the camera body 100.

Figure 2A:
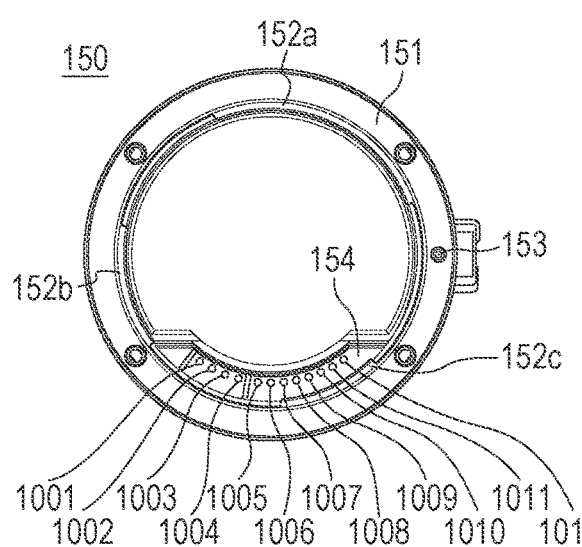
FIG. 2A is a schematic diagram of a mount unit.
Figure 2B:
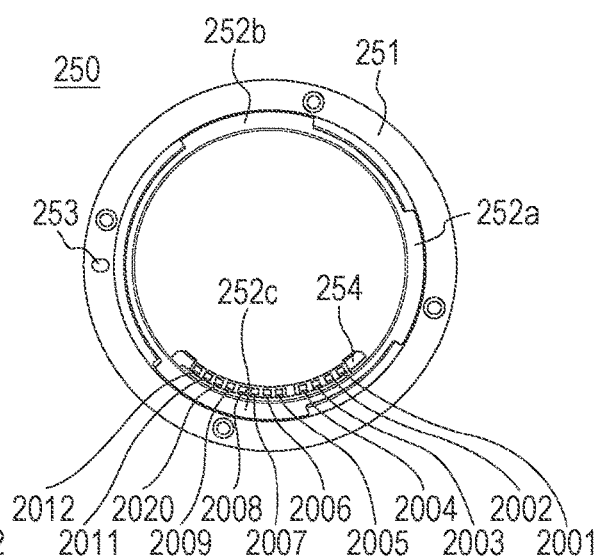
FIG. 2B is a schematic diagram of a mount unit.
Figure 2C:
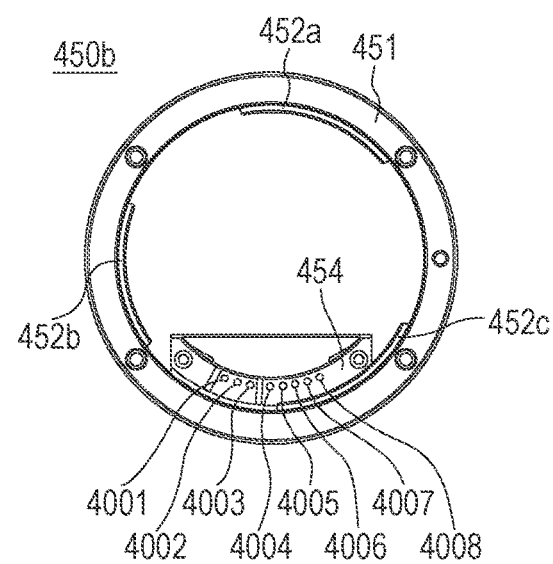
FIG. 2C is a schematic diagram of a mount unit.
Figure 2D:
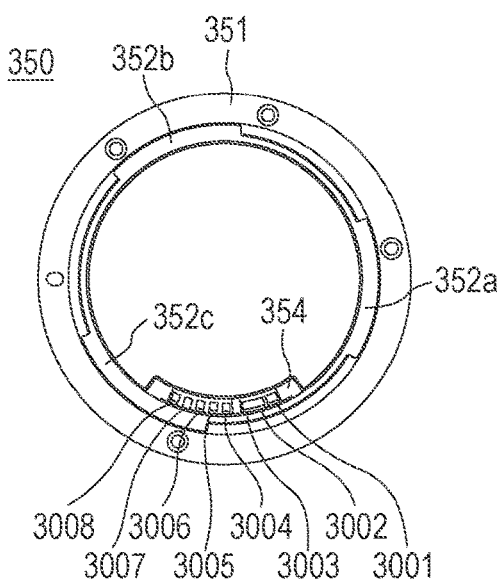
FIG. 2D is a schematic diagram of a mount unit.

Next, the mount units of the camera body 100, the lens apparatus 200, the lens apparatus 300, the intermediate accessory device 500, and the intermediate accessory device 400 will be described with reference to FIGS. 2A and 2B. FIG. 2A is a schematic diagram of the mount unit 150 of the camera body 100 as viewed from the subject side, and FIG. 2B is a schematic diagram of the mount unit 250 of the lens apparatus 200 as viewed from the image plane side. FIG. 2C is a schematic diagram of the mount unit 450b of the intermediate accessory device 400 as viewed from the subject side, and FIG. 2D is a schematic diagram of the mount unit 350 of the lens apparatus 300 as viewed from the image plane side.

The mount unit 150 is provided to the front side (subject side) of the camera body 100. The mount unit 150 has a mount reference face 151 having a ring shape for ensuring a predetermined flange focal distance. Three bayonet claws 152a through 152c are provided on the inner side of the mount reference face 151 in the circumferential direction. A lock pin 153 for positioning when bayonet-coupling the mount unit of an accessory device to the mount unit 150 is provided to the mount unit 150, to be retractably protruding with regard to the mount reference face 151. When the mount unit 150 and the mount unit of an accessory device are relatively rotated to a position where mounting is complete, the lock pin 153 engages a fitting hole provided to the mount unit of the accessory device.

A camera-side contact holding member 154 is provided at a region inward from the bayonet claws 152a through 152c. The camera-side contact holding member 154 holds electric contacts (camera-side electric contacts) 1001 through 1012.

The mount unit 550b of the intermediate accessory device 500 has the same configuration as that of the mount unit 150 illustrated in FIG. 2A.

The mount unit 250 is fixed to the rear end (image plane side) of the lens apparatus 200. The mount unit 250 has a mount reference face 251 having a ring shape that is a reference face for flange focal distance. Three bayonet claws 252a through 252c are provided on the inner side of the mount reference face 251 in the circumferential direction. Further, a fitting hole 253 is provided to the mount unit 250. The lock pin 153 fits into the fitting hole 253 when mounting of the lens apparatus 200 to the camera body 100 is complete.

An accessory-side contact holding member 254 is provided at a region inward from the bayonet claws 252a through 252c. The accessory-side contact holding member 254 holds electric contacts (lens-side electric contacts) 2001 through 2012.

The mount unit 550a of the intermediate accessory device 500 and the mount unit 450a of the intermediate accessory device 400 have the same configuration as the mount unit 250 illustrated in FIG. 2B. That is to say, the mount unit 550a and the mount unit 450a have accessory-side contact holding units that hold electric contacts (accessory side electric contact group) 2001 through 2012.

In the same way as the mount unit 150, the mount unit 450 has a mount reference face 451, bayonet claws 452a through 452c, and a contact holding member 454. However, the length of the bayonet claws 452a through 452c and the intervals between the bayonet claws differ from those of the bayonet claws 152a through 152c of the mount unit 150.

In the same way as the mount unit 250, the mount unit 350 has a mount reference face 351, bayonet claws 352a through 352c, and a contact holding member 354. However, the length of the bayonet claws 352a through 352c and the intervals between the adjacent bayonet claws differ from those of the bayonet claws 252a through 252c of the mount unit 250.

Figure 3:
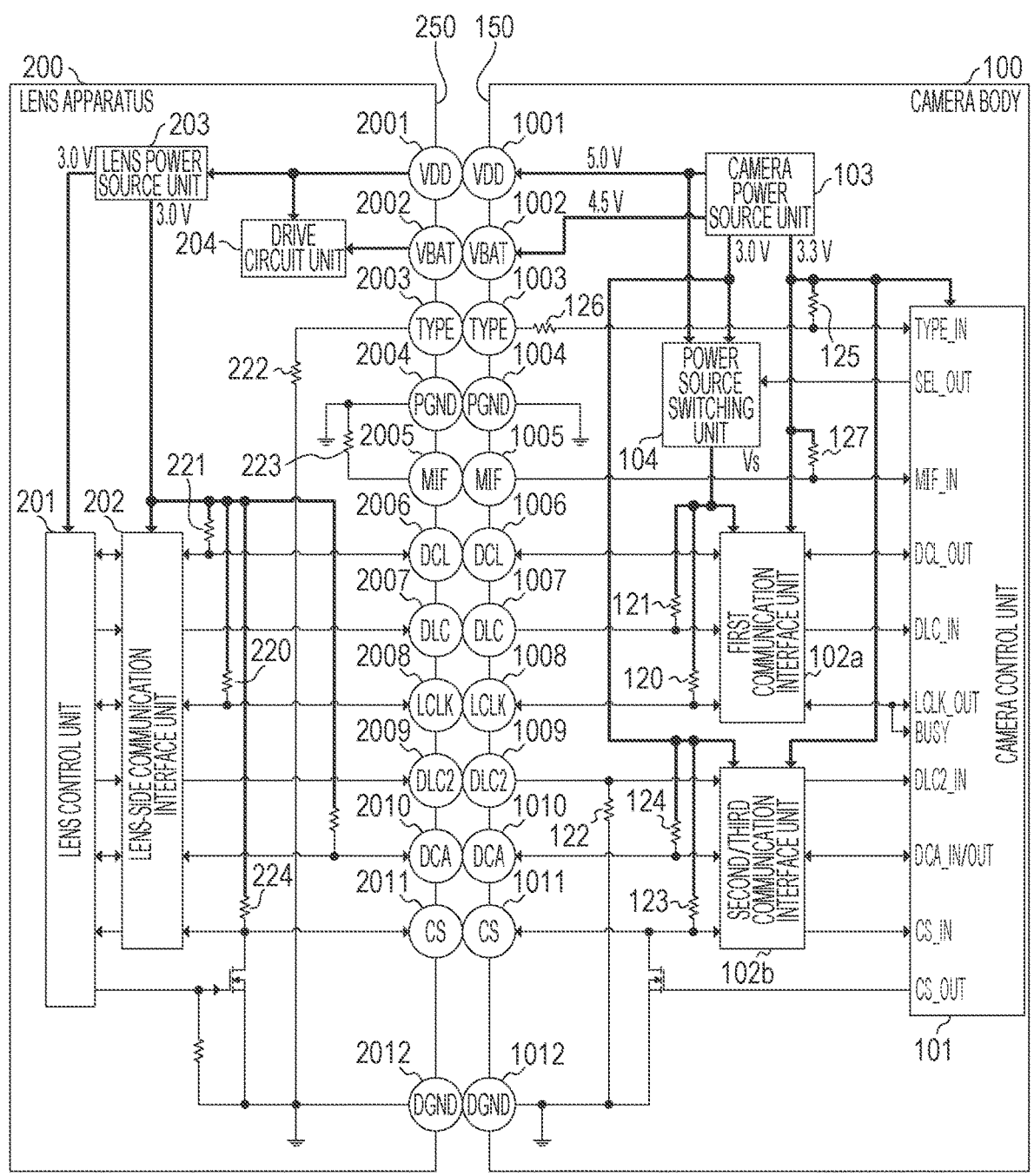
FIG. 3 is a block diagram of the imaging apparatus and the lens apparatus according to an embodiment of the present invention.

Next, a case where the lens apparatus 200 is mounted to the camera body 100 will be described with reference to FIG. 3. FIG. 3 is a block diagram illustrating a circuit configuration of a state where the lens apparatus 200 is mounted to the camera body 100. The lens apparatus 200 and the camera body 100 can communicate via a communication path made up by some of the multiple electric contacts provided to the mount unit 150 and the mount unit 250. The lens apparatus 200 and the camera body 100 can perform a first communication, a second communication, and a third communication which will be described below. That is to say, the lens apparatus 200 corresponds to a second lens apparatus.

A camera control unit 101 serving as a camera control unit controls communication with an accessory device mounted to the camera body 100, by controlling output of electric contacts provided to the mount unit 150, processing signals input to electric contacts, and so forth.

A camera power source unit 103 is a power source that is used to operate the parts of the camera body 100 and the accessory device mounted to the camera body 100. The camera power source unit 103 generates multiple different voltages, and supplies power of these voltages to the parts of the camera body 100 and the accessory device mounted to the camera body 100.

A power source switching unit 104 supplies power to a first communication interface unit 102a. The power source switching unit 104 is supplied with power of two different voltage values from the camera power source unit 103, and can switch the power to be supplied to the first communication interface unit 102a, under control of the camera control unit 101.

A lens control unit 201 serving as a lens control unit controls communication between the camera body 100 and the lens apparatus 200, by controlling output of electric contacts provided to the mount unit 250, processing signals input to electric contacts, and so forth.

A lens power source unit 203 generates power of a predetermined voltage from the power supplied from the camera body 100, and supplies the generated predetermined voltage to the lens control unit 201 and a lens-side communication interface unit 202.

The electric contact 1001 and the electric contact 2001 are terminals for supplying power that is used for control of communication primarily between the camera body 100 and the lens apparatus 200 (communication power), from the camera power source unit 103 of the camera body 100 to the lens apparatus 200. Hereinafter, the electric contact 1001 and the electric contact 2001 may also be referred to as a VDD terminal 1001 and a VDD terminal 2001, respectively. In the present embodiment, the voltage of power to be supplied to the lens apparatus 200 by the VDD terminal 1001 (hereinafter referred to as a VDD voltage) is 5.0 V.

The electric contact 1002 and the electric contact 2002 are terminals for supplying power that are used primarily for operations of driving systems such as motors and the like (drive power), from the camera body 100 to the lens apparatus 200. Hereinafter, the electric contact 1002 and the electric contact 2002 may also be referred to as a VBAT terminal 1002 and a VBAT terminal 2002. In the present embodiment, the voltage of power supplied to the lens apparatus 200 by the VBAT terminal 1002 (hereinafter referred to as a VBAT voltage) is 4.5 V. The VDD terminals and the VBAT terminals may also be collectively referred to as power source system terminals.

The electric contact 1012 and the electric contact 2012 are terminals that ground communication control system circuits of the camera body 100 and lens apparatus 200 (bringing down to ground level). That is to say, these are ground terminals corresponding to the VDD terminals. Hereinafter, the electric contact 1012 and the electric contact 2012 may also be referred to as a DGND terminal 1012 and a DGND terminal 2012, respectively.

The electric contact 1004 and the electric contact 2004 are terminals that ground drive system circuits including motors and so forth, provided to the camera body 100 and the lens apparatus 200 (bringing down to ground level). That is to say, these are ground terminals corresponding to the VBAT terminals. Hereinafter, the electric contact 1004 and the electric contact 2004 may also be referred to as a PGND terminal 1004 and a PGND terminal 2004. The DGND terminals and the PGND terminals may also be collectively referred to as ground terminals.

The electric terminal 1005 and the electric terminal 2005 are terminals for detecting that a lens apparatus has been mounted to the camera body 100. The camera control unit 101 detects mounting and detaching of a lens apparatus to and from the camera body 100 in accordance with the voltage level of the electric contact 1005. When the camera control unit 101 detects mounting of a lens apparatus, power supply to the lens apparatus via the VDD terminal 1001 and the VBAT terminal 1002 is started. Hereinafter, the electric terminal 1005 and electric terminal 2005 may be also referred to as a MIF terminal 1005 and a MIF terminal 2005, respectively.

The electric contact 1003 and the electric contact 2003 are terminals for distinguishing the type of accessory device mounted to the camera body 100. The electric contact 1003 is pulled up to the same voltage as the power supplied to the camera control unit 101 within the camera body 100, by a resistor 125. The electric contact 2003 is pulled down to ground (DGND) via a resistor 222 within the lens apparatus 200. The camera control unit 101 detects the voltage value at the electric contact 1003, and distinguishes the type of accessory device mounted to the camera body 100 based on the detected voltage value. That is to say, the camera control unit 101 also functions as a distinguishing unit that distinguishes the type of accessory device mounted to the camera control unit 101. The camera control unit 101 also controls the power source switching unit 104 to switch the power to be supplied to the first communication interface unit 102*a* by the power source switching unit 104 in accordance with the type of accessory device mounted to the camera body 100. Accordingly, the camera body 100 and the accessory device mounted to the camera body 100 can communicate at an appropriate communication voltage. Hereinafter, the electric contact 1003 and the electric contact 2003 may also be referred to as a TYPE terminal 1003 and a TYPE terminal 2003, respectively.

The electric contacts 1006 through 1008 and the electric contacts 2006 through 2008 are terminals for later-described first communication. The input/output of the electric contacts 1006 through 1008 is controlled by the camera control unit 101 via the first communication interface unit 102*a*. The input/output of the electric contacts 2006 through 2008 is controlled by the lens control unit 201 via the lens-side communication interface unit 202.

The electric contact 1008 (a first camera-side electric contact, also referred to as a first electric contact) and the electric contact 2008 (a first lens-side electric contact, also referred to as a fifth electric contact) are terminals capable of outputting clock signals for the first communication from the camera body 100 to the lens apparatus 200. The electric contact 1008 and the electric contact 2008 are also used for the lens apparatus 200 to notify the camera body 100 of a communication standby request. Hereinafter, the electric contact 1008 and the electric contact 2008 may also be referred to as a LCLK terminal 1008 and a LCLK terminal 2008, respectively. The LCLK terminal 1008 is pulled up to the same potential as the interface voltage of the first communication interface unit 102*a* via a resistor 120 within the camera body 100. The LCLK terminal 2008 is pulled up to the same potential as the interface voltage of the lens-side communication interface unit 202 via a resistor 220 within the lens apparatus 200.

The electric contact 1006 (second camera-side electric contact, also referred to as a second electric contact) and the electric contact 2006 (a second lens-side electric contact, also referred to as a sixth electric contact) are terminals capable of transmitting data from the camera body 100 to the lens apparatus 200 by the first communication. Hereinafter, the electric contact 1006 and the electric contact 2006 may also be referred to as a DCL terminal 1006 and a DCL terminal 2006, respectively. The DCL terminal 2006 is pulled up to the same potential as the interface voltage of the lens-side communication interface unit 202 via a resistor 221 within the lens apparatus 200.

The electric contact 1007 (a third camera-side electric contact, also referred to as a third electric contact) and the electric contact 2007 (a third lens-side electric contact, also referred to as a seventh electric contact) are terminals capable of transmitting data from the lens apparatus 200 to the camera body 100 by the first communication. Hereinafter, the electric contact 1007 and the electric contact 2007 may also be referred to as a DLC terminal 1007 and a DLC terminal 2007, respectively. The DLC terminal 1007 is pulled up to the same potential as the interface voltage of the first communication interface unit 102*a* via a resistor 121 within the camera body 100.

Hereinafter, the LCLK terminal 1008, the DCL terminal 1006, and the DLC terminal 1007, which are used in the first communication, may also be referred to as a first camera-side electric contact group or a first electric contact group. Also, the LCLK terminal 2008, the DCL terminal 2006, and the DLC terminal 2007, which are used in the first communication, may also be referred to as a first lens-side electric contact group or a third electric contact group. A DLC2 terminal 1009, a DCA terminal 1010, and a CS terminal 1011, which are electric contacts for a communication that differs from the first communication, i.e., the second communication and the third communication, may also be referred to as a second camera-side electric contact group or a second electric contact group.

The electric contact 1009 (a fourth camera-side electric contact, also referred to as a fourth electric contact) and an electric contact 2009 are for later-described second communication. The electric contact 1009 and the electric contact 2009 are terminals capable of transmitting data from the lens apparatus 200 to the camera body 100 by the second communication. Hereinafter, the electric contact 1009 and the electric contact 2009 may also be referred to as a DLC2 terminal 1009 and a DLC2 terminal 2009, respectively. The DLC2 terminal 1009 is pulled down to the same potential as the DGND terminal via a resistor 122 within the camera body 100.

The electric contacts 1010 and 1011, and the electric contacts 2010 and 2011, are terminals for later-described third communication.

The electric contact 1010 and the electric contact 2010 are terminals capable of bi-directionally exchanging data between the camera body 100 and the lens apparatus 200 by the third communication. Hereinafter, the electric contact 1010 and the electric contact 2010 may also be referred to as a DCA terminal 1010 and a DCA terminal 2010, respectively. The DCA terminal 1010 is pulled up to the same potential as the interface voltage as the second/third communication interface unit 102b via a resistor 124 within the camera body 100. The DCA terminal 1010 is connected to the camera control unit 101 via a CMOS-type input/output interface. In the same way, the DCA terminal 2010 is connected to the lens control unit 201 via a CMOS-type input/output interface. Accordingly, the camera control unit 101 and the lens control unit 201 can exchange data at high speeds, using the DCA terminals 1010 and 2010.

The electric contact 1011 and the electric contact 2011 are terminals for notification of a later-described predetermined timing relating to the third communication between the camera body 100 and the lens apparatus 200. Hereinafter, the electric contact 1011 and the electric contact 2011 may also be referred to as a CS terminal 1011 and a CS terminal 2011, respectively. The CS terminal 1011 is pulled up to the same potential as the interface voltage of the second/third communication interface unit 102b via a resistor 123 within the camera body 100. Also, the CS terminal 2011 is pulled up to the same potential as the interface voltage of the lens-side communication interface unit 202 via a resistor 224 within the lens apparatus 200. The CS terminal 1011 is connected to the camera control unit 101 via an open-type output interface. In the same way, the CS terminal 2011 is connected to the lens control unit 201 via an open-type output interface. Note that the open-type output interface here means an output interface that is an open drain or an open collector.

In a case where the lens apparatus 200 is mounted to the camera body 100 in the present embodiment, the interface voltages of the first communication interface unit 102a and the second/third communication interface unit 102b are set to 3.0 V (first voltage). The interface voltage of the lens-side communication interface unit 202 is also set to 3.0 V (first voltage). Hereinafter, the LCLK terminals, the DCL terminal, the DLC terminals, the DCL2 terminals, the CS terminals and the DCA terminals, may be collectively referred to as communication system terminals.

Next, the shapes of the camera-side contact holding member 154 of the mount unit 150 and the accessory-side contact holding member 254 of the mount unit 250 will be described with reference to FIGS. 4A and 4B.

Figure 4:
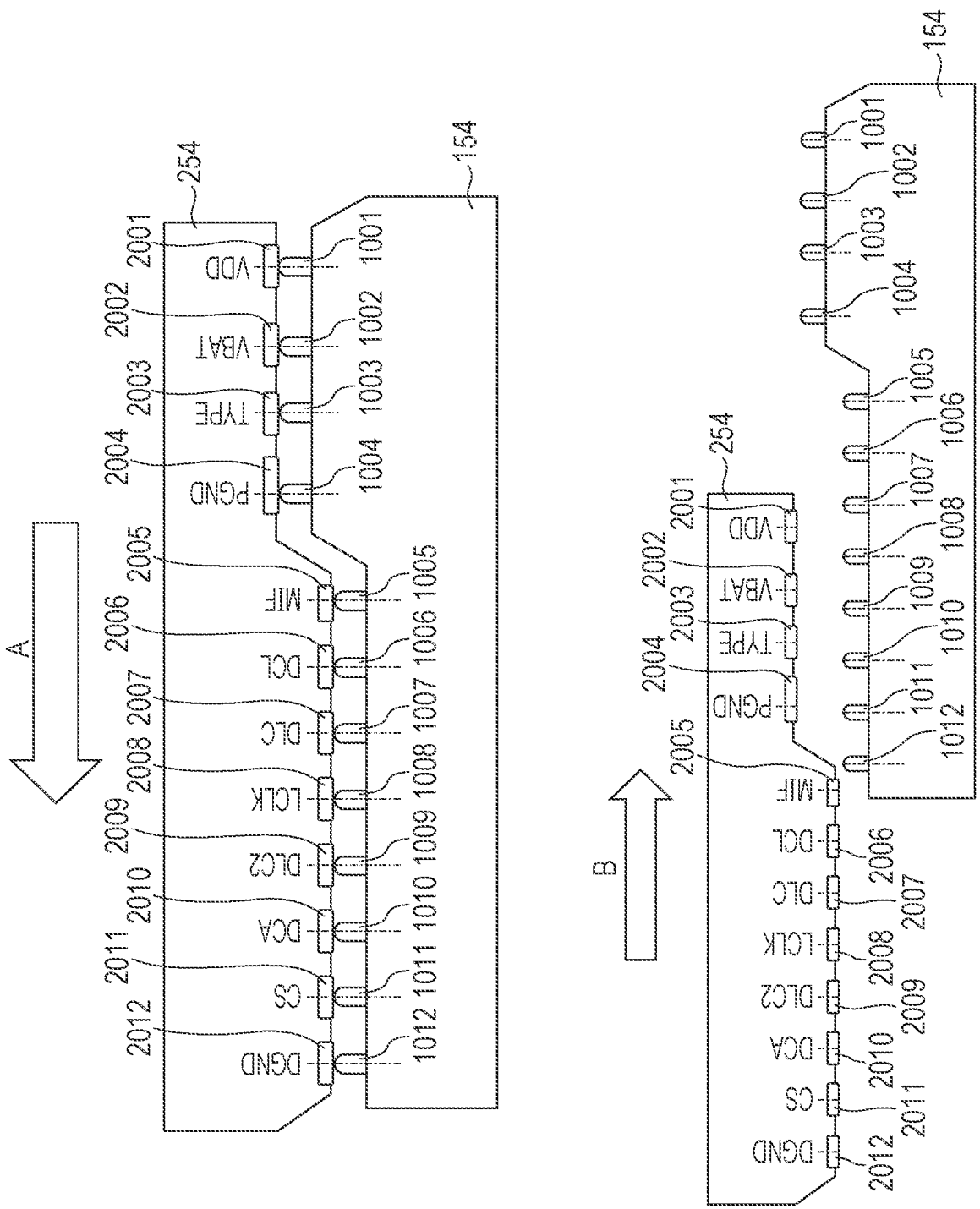
FIG. 4A is a schematic diagram of a camera-side contact holding member and an accessory-side contact holding member.
FIG. 4B is a schematic diagram of a camera-side contact holding member and an accessory-side contact holding member.

FIG. 4A is a schematic diagram viewing the camera-side contact holding member 154 and the accessory-side contact holding member 254 from a direction perpendicular to the optical axis, in a state where the lens apparatus 200 is mounted to the camera body 100. FIG. 4B is a schematic diagram viewing the camera-side contact holding member 154 and the accessory-side contact holding member 254 from a direction perpendicular to the optical axis, in a state where the lens apparatus 200 is completely dismounted from the camera body 100. FIGS. 4A and 4B illustrate the camera-side contact holding member 154 and the accessory-side contact holding member 254 in planar view. However, in reality, the shapes of the camera-side contact holding member 154 and the accessory-side contact holding member 254 are curved along the circumferential direction of the mount unit 150 and the mount unit 250. In FIGS. 4A and 4B, although the electric contacts of the camera body 100 are illustrated as pins and the electric contacts of the lens apparatus 200 as contact pieces, an arrangement may be made where the electric contacts of the camera body 100 are contact pieces and the electric contacts of the lens apparatus 200 are pins.

An arrow A illustrated in FIG. 4A indicates the direction in which the lens apparatus 200 moves as to the camera body 100 (rotation direction) when the lens apparatus 200 is detached from the camera body 100. When the lens apparatus 200 is detached, the VDD terminal 2001 for example comes into contact with the TYPE terminal 1003 after having come into contact with the VBAT terminal 1002.

An arrow B illustrated in FIG. 4B indicates the direction in which the lens apparatus 200 moves as to the camera body 100 (rotation direction) when the lens apparatus 200 is mounted to the camera body 100. The direction of the arrow B corresponds to a first direction. When the lens apparatus 200 is mounted, the VDD terminal 2001 for example is connected to the VDD terminal 1001 after having come into contact with the VBAT terminal 1002.

Also, the camera-side contact holding member 154 and the accessory-side contact holding member 254 have a stepped shape in the optical axis direction, as illustrated in FIGS. 4A and 4B. The electric contacts 1001 through 1004 and the electric contacts 1005 through 1012 are provided on different platforms. In the same way, the electric contacts 2001 through 2004 and the electric contacts 2005 through 2012 are provided on different platforms. Accordingly, the electric contacts 2001 through 2004 can be kept from coming into contact with the electric contacts 1005 through 1012 when the lens apparatus 200 is mounted to the camera body 100. Accordingly, the amount of wear of the electric contacts when the lens apparatus 200 is mounted to and detached from the camera body 100 can be reduced.

Further, the camera body 100 according to the present embodiment has system terminals on the platform having fewer electric contacts. In the same way, the lens apparatus 200 according to the present embodiment has power source system terminals on the platform having fewer electric contacts. Accordingly, the amount of wear of the power source system terminals when the lens apparatus 200 is mounted to and detached from the camera body 100 can be further reduced, and increase in contact impedance can be suppressed. As a result, stable power supply can be performed over a long time.

The ground terminals are also preferably provided on the platform having fewer electric contacts for stable power supply.

Meanwhile, the DGND terminal 1012 and the DGND terminal 2012 are preferably brought into contact with a metal portion of the mount unit 150 and the mount unit 250, in order to reduce the influence of static electricity on the internal circuits. In this case, the DGND terminal 1012 is preferably disposed at the end of the array of electric contacts 1001 through 1012, in order to facilitate forming of the mount unit 150. In the same way, the DGND terminal 2012 is preferably disposed at the end of the array of electric contacts 2001 through 2012, in order to facilitate forming of the mount unit 250.

In light of this, the PGND terminal 1004 is provided on the platform holding fewer electric contacts, and the DGND terminal 1012 is provided at the end of the array of electric contacts 1001 through 1012 in the present embodiment. In the same way, the PGND terminal 2004 is provided on the platform holding fewer electric contacts, and the DGND terminal 2012 is provided at the end of the array of electric contacts 2001 through 2012.

Next, the order of the array of the electric contacts on the camera-side contact holding member 154 and the accessory-side contact holding member 254 will be described.

In the present embodiment, the PGND terminal 1004, the TYPE terminal 1003, the VBAT terminal 1002, and the VDD terminal 1001 are disposed on the platform having fewer electric contacts on the camera-side contact holding member 154, in the order of the mounting direction of the lens apparatus 200 (direction of the arrow B in FIG. 4B). In the same way, the PGND terminal 2004, the TYPE terminal 2003, the VBAT terminal 2002, and the VDD terminal 2001 are disposed on the platform holding fewer electric contacts on the accessory-side contact holding member 254, in the order of the mounting direction of the lens apparatus 200 (direction of the arrow B in FIG. 4B).

If an electroconductive foreign substance is caught between the camera-side contact holding member 154 and the accessory-side contact holding member 254, or an electric contact is deformed, adjacent electric contacts may short-circuit each other. Particularly, in a case where the power source system terminals (the VDD terminals and the VBAT terminals) short-circuit with the ground terminals (the PGND terminals), a large electric current will flow to the power source circuit. To counter this, the influence of short-circuiting on the power source circuit can be reduced by providing different electric contacts between the power source system terminals and the ground terminals.

The terminals provided between the power source system terminals and the ground terminals preferably are terminals that have a generally constant signal level during operations of the camera body 100 and the lens apparatus 200. Normally, a protective element, for protecting internal circuits of the camera body 100 when short-circuiting occurs, is provided between the terminals adjacent to the power source system terminals and the camera control unit 101. In a case where terminals of which the signal level changes during operations of the camera body 100 and the lens apparatus 200, such as communication system terminals, are provided between the power source system terminals and the ground terminals, the wiring capacitance of these terminals will increase due to the protective element. Accordingly, the signal waveforms transmitted or received through these terminals can be affected. On the other hand, terminals that have a generally constant signal level during operations of the camera body 100 and the lens apparatus 200 will be affected less by providing the protective element. The TYPE terminals and the MIF terminals are terminals that have a generally constant signal level during operations, but the MIF terminals are preferably provided to the platform where there are more electric contacts, which will be described later, so the TYPE terminals are preferably provided between the power source system terminals and the ground terminals. Note that a resistor 126 is disposed between the TYPE terminal 1003 and the camera control unit 101 as the protective element in the present embodiment.

The MIF terminal 1005 is disposed on the platform of the camera-side contact holding member 154 that has a greater number of electric contacts, at a position that is closest to the platform having fewer electric contacts, in the present embodiment. In a corresponding manner, the MIF terminal 2005 is disposed on the platform of the accessory-side contact holding member 254 that has a greater number of electric contacts, at a position that is closest to the platform having fewer electric contacts.

Disposing the MIF terminal 1005 at this position enables the MIF terminal 2005 to be the only electric contact coming into contact with the MIF terminal 1005 when the lens apparatus 200 is attached to and detached from the camera body 100. Accordingly, the wear on the MIF terminal 1005 can be reduced. This makes defective contact of the MIF terminal 1005 less likely to occur, and whether the lens apparatus is mounted can be appropriately detected.

Since the MIF terminal 2005 comes into contact with the electric contacts 1006 through 1012 when the lens apparatus 200 is attached to and detached from the camera body 100, it can be said that the MIF terminal 2005 is provided at a position where the amount of wear due to sliding is great. However, multiple types of camera accessories are mounted to the camera body 100, as illustrated in FIG. 1, and therefore the amount of wear of the electric contacts on the lens apparatus 200 is small as compared to that on the camera body 100. Accordingly, the electric contacts are arrayed in the present embodiment so that the amount of wear of the MIF terminal 1005 of the camera body 100 is small.

Further, if the MIF terminal 1005 comes into contact with other electric contacts when the lens apparatus 200 is mounted to the camera body 100, the voltage level of the MIF terminal 1005 may change and the camera control unit 101 may falsely detect mounting of the lens apparatus. If there is false detection of the lens apparatus 200 before mounting of the lens apparatus 200 is complete, power supply by the power source system terminals may be started, which can lead to malfunctioning of the lens apparatus 200 and affect internal circuits of the lens apparatus 200. However, disposing the MIF terminal 1005 as in the present embodiment enables starting of power supply before the MIF terminals are connected to each other (before completion of mounting of the lens apparatus 200) to be prevented or reduced.

The length of the MIF terminal 2005 of the lens apparatus 200 in the circumferential direction of the mount unit 250 preferably is shorter than that of the other electric contacts. Accordingly, when the lens apparatus 200 is mounted to the camera body 100, the MIF terminal 1005 can be made to be connected last of the multiple electric contacts. In this case, power supply from the camera body 100 to the lens apparatus 200 can be performed after connection of the other electric contacts has been completed. Also, when the lens apparatus 200 is detached from the camera body 100, the MIF terminal 1005 can be disengaged first among the multiple electric contacts. In this case, power supply from the camera body 100 to the lens apparatus 200 can be immediately stopped when the lens apparatus 200 is detached from the camera body 100. It is sufficient for the length of the MIF terminal 2005 in the circumferential direction of the mount unit 250 to be shorter than the other electric contacts by an amount equivalent of 1 degree center angle.

The order of the communication system terminals in the present embodiment is appropriately arranged, in view of the roles of the terminals. Specifically, the CS terminal 1011 is disposed adjacent to the DGND terminal 1012, and the DCA terminal 1010 is disposed on the opposite side of the CS terminal 1011 from the DGND terminal 1012. In the same way, the CS terminal 2011 is disposed adjacent to the DGND terminal 2012, and the DCA terminal 2010 is disposed on the opposite side of the CS terminal 2011 from the DGND terminal 2012. Accordingly, electrical influence on the camera body 100 and the lens apparatus 200 from unintentional connection among the electric contacts with each other is reduced, while the communication speed of the third communication is increased, which will be described later.

The DLC2 terminal 1009 for the second communication is provided between the DCA terminal 1010 and the LCLK terminal 1008. In the same way, the DLC2 terminal 2009 for the second communication is provided between the DCA terminal 2010 and the LCLK terminal 2008. Accordingly, electrical influence on the camera body 100 and the lens apparatus 200 from unintentional connection among electric contacts with each other is reduced, which will be described later.

Further, the CS terminal 1011, the DCA terminal 1010, the DLC2 terminal 1009, and the first camera-side electric contact group, are disposed in this order in the first direction on the camera-side contact holding member 154. That is to say, the amount of sliding that the electric contacts in the first camera-side electric contact group experience due to attaching/detaching of the accessory device is smaller than that at any of the CS terminal 1011, the DCA terminal 1010, and the DLC2 terminal 1009. Accordingly, defective communication due to wear of the electric contacts is reduced, which will be described later.

Next, a case of mounting the lens apparatus 200 to the camera body 100 via the intermediate accessory device 500 will be described with reference to FIG. 5. The intermediate accessory device 500 can perform the third communication with the camera body 100.

Figure 5:
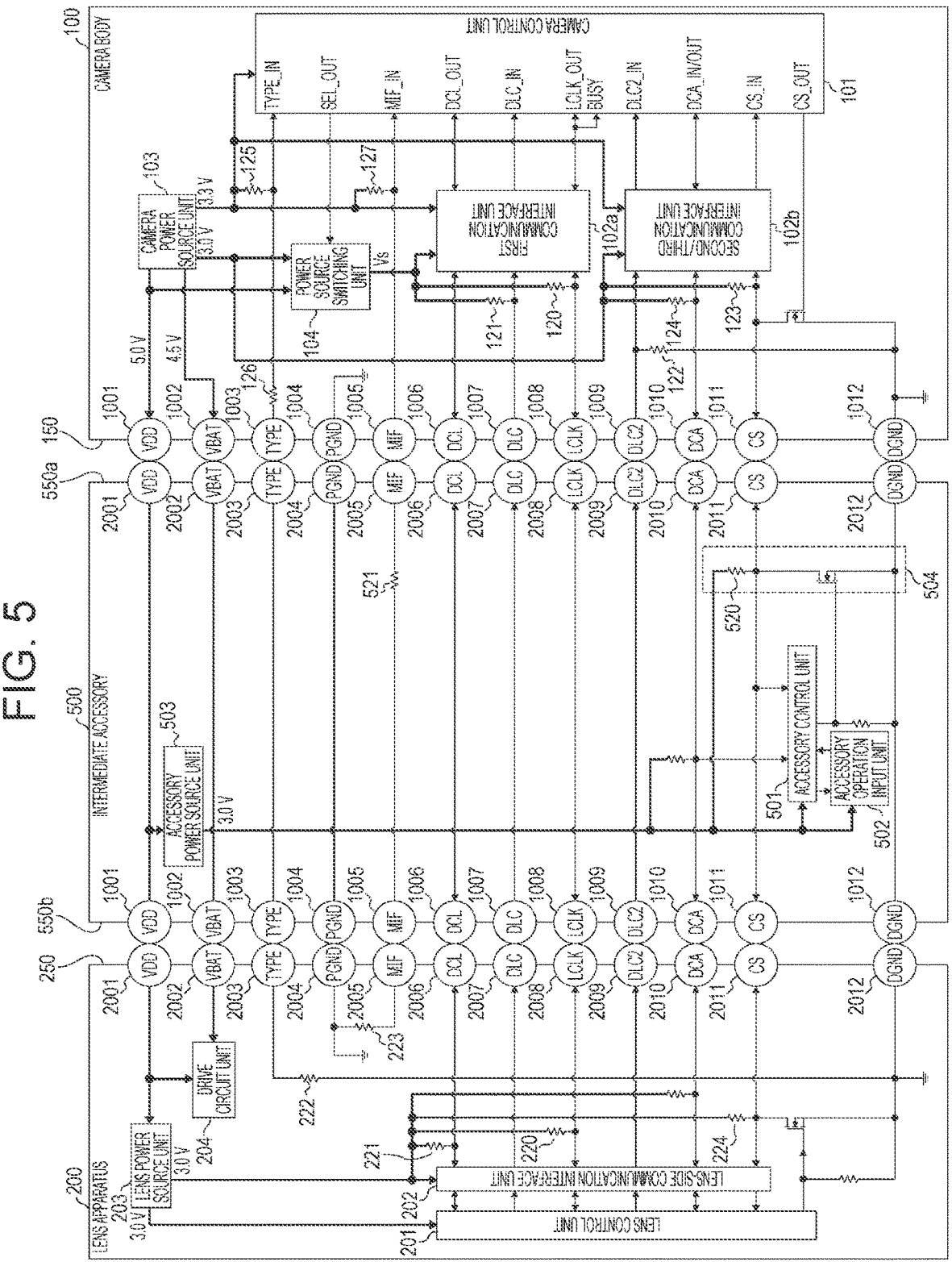
FIG. 5 is a block diagram of the imaging apparatus, the lens apparatus, and the intermediate accessory device according to an embodiment of the present invention.

FIG. 5 is a block diagram illustrating a camera system in which the lens apparatus 200 is mounted to the camera body 100 via the intermediate accessory device 500. The intermediate accessory device 500 has the mount unit 550a and the mount unit 550b, as described earlier. The intermediate accessory device 500 also has an accessory control unit 501 that controls communication with the camera body 100 and performs processing in accordance with operation of an operating member (omitted from illustration) provided to the intermediate accessory device 500. Operation of the operating member is communicated to the accessory control unit 501 via an accessory operation input unit 502. An example of an operating member is a function ring by which the aperture value can be set.

The mount unit 550a is the same as the mount unit 250 described above of the lens apparatus 200. Accordingly, in a state where the intermediate accessory device 500 is mounted to the camera body 100, the electric contacts 2001 through 2012 on the mount unit 550a are in contact with the electric contacts 1001 through 1012 on the camera body 100. The mount unit 550b also is the same as the mount unit 150 described above of the camera body 100. Accordingly, in a state where the lens apparatus 200 is mounted to the intermediate accessory device 500, the electric contacts 1001 through 1012 on the mount unit 550b come into contact with the electric contacts 2001 through 2012 on the lens apparatus 200. The electric contacts 2001 through 2012 on the mount unit 550a are connected to the electric contacts 1001 through 1012 on the mount unit 550b by wiring within the intermediate accessory device 500.

In the intermediate accessory device 500, the VDD terminal 2001 is also connected to an accessory power supply unit 503, and is configured to supply electric power to the intermediate accessory device 500 as well. In the present embodiment, the accessory power supply unit 503 generates power of 3.0 V, and supplies the power to the accessory control unit 501 and an accessory operation input unit 502. The DCA terminal 2010 and the CS terminal 2011 for the third communication in the intermediate accessory device 500 are also connected to the accessory control unit 501, and therefore the intermediate accessory device 500 and the camera body 100 can perform the third communication.

In a case where the lens apparatus 200 is mounted to the camera body 100 via the intermediate accessory device 500, the interface voltage of the first communication interface unit 102a and the second/third communication interface unit 102b is set to 3.0 V. The interface voltage of the lens-side communication interface unit 202 also is set to 3.0 V.

This so far has been a description of a case where the lens apparatus 200 is mounted to the camera body 100.

Next, a case of mounting the lens apparatus 300 to the camera body 100 will be described with reference to FIG. 6. The lens apparatus 300 is a lens apparatus according to a conventional arrangement, as mentioned earlier, and differs from the lens apparatus 200 according to the present embodiment. The lens apparatus 300 cannot perform the second communication or the third communication with the camera body 100, but can perform the first communication. That is to say, the lens apparatus 300 corresponds to a first lens apparatus. The intermediate accessory device 400 can perform the third communication with the camera body 100.

Figure 6:
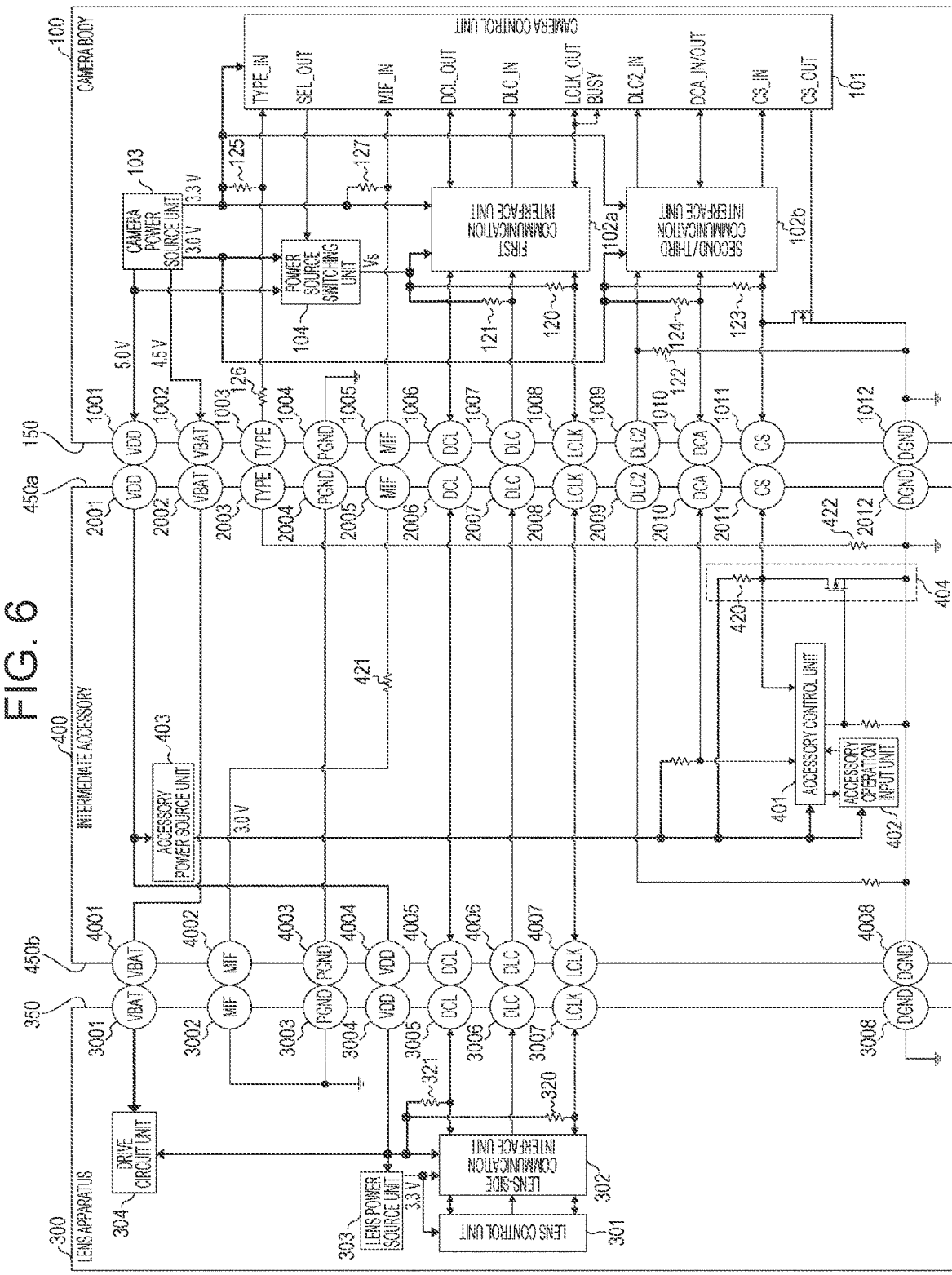
FIG. 6 is a block diagram of the imaging apparatus and the intermediate accessory device according to an embodiment of the present invention, and a lens apparatus according to a conventional arrangement.

FIG. 6 is a block diagram illustrating a camera system in which the lens apparatus 300 is mounted to the camera body 100 via the intermediate accessory device 400. As described above, the intermediate accessory device 400 has the mount units 450a and 450b. The intermediate accessory device 400 also has an accessory control unit 401 that performs communication with the camera body 100, and processing in accordance with operations made at an operating member omitted from illustration. Operations performed on the operating member are notified to the adapter control unit 401 via an accessory operation input unit 402.

The mount unit 450a is the same as the mount unit 250 of the lens apparatus 200. However, the internal circuits of the intermediate accessory device 400 and the internal circuits of the lens apparatus 200 are different. Specifically, the DCL terminal 2006, the DLC terminal 2007, and the LCLK terminal 2008, for the first communication, are not connected to the adapter control unit 401 in the intermediate accessory device 400, and are connected to the corresponding electric contacts of the mount unit 450b by through wiring. On the other hand, the DCA terminal 2010 and the CS terminal 2011 for the third communication are connected to the adapter control unit 401 in the intermediate accessory device 400. This configuration is for performing the third communication between the intermediate accessory device 400 and the camera body 100, and is not for performing the first communication.

The DLC2 terminal 2009 for the second communication is pulled down to the same level as the DGND terminal 2012 via resistance in the intermediate accessory device 400. This is because the lens apparatus 300 and the camera body 100 do not perform the second communication.

The TYPE terminal 2003 also is pulled down to the same level as the DGND terminal 2012 by a resistor 422 in the intermediate accessory device 400. The resistor 422 has a resistance value that is different from that of the resistor 222 of the lens apparatus 200.

Next, the electric contacts provided to the mount unit 450b and the mount unit 350 will be described.

An electric contact 3001 and an electric contact 4001 are terminals for supplying driving power from the VBAT terminal 1002 of the camera body 100 to the lens apparatus 300. The VBAT terminal 2002 is connected to the electric contact 4001 by through wiring in the intermediate accessory device 400. Hereinafter, the electric contact 3001 and the electric contact 4001 may also be referred to as the VBAT terminal 3001 and the VBAT terminal 4001. In the present embodiment, the voltage of power supplied to the lens apparatus 300 by the VBAT terminal 1002 is 4.5 V.

An electric contact 3004 and an electric contact 4004 are terminals for supplying communication power from the VDD terminal 1001 of the camera body 100 to the lens apparatus 300. The VDD terminal 2001 is connected to the electric contact 4004 by through wiring in the intermediate accessory device 400, and also is connected to an accessory power source unit 403 in the intermediate accessory device 400. The adapter power source unit 403 generates power of 3.0 V as power for the adapter control unit 401 and the accessory operation input unit. Hereinafter, the electric contact 3004 and the electric contact 4004 may also be referred to as a VDD terminal 3004 and a VDD terminal 4004, respectively. Note that in the present embodiment, the voltage of power supplied to the lens apparatus 300 by the VDD terminal 1001 is 5.0 V.

An electric contact 3003 and an electric contact 4003 are terminals for grounding the driving systems of the camera body 100 and the lens apparatus 300. That is to say, these are ground terminals corresponding to the VBAT terminals. The PGND terminal 2004 is connected to the electric contact 4003 by through wiring in the intermediate accessory device 400. Hereinafter, the electric contact 3003 and the electric contact 4003 may also be referred to as a PGND terminal 3003 and a PGND terminal 4003, respectively.

An electric contact 3008 and an electric contact 4008 are terminals for grounding the communication systems of the camera body 100 and the lens apparatus 300. That is to say, these are ground terminals corresponding to the VDD terminals. The VDD terminal 2012 is connected to the electric contact 4008 by through wiring in the intermediate accessory device 400. Hereinafter, the electric contact 3008 and the electric contact 4008 may also be referred to as a DGND terminal 3008 and a DGND terminal 4008, respectively.

An electric contact 3002 and an electric contact 4002 are terminals for detecting that the lens apparatus 300 is mounted to the camera body 100 via the intermediate accessory device 400. Upon detecting that the lens apparatus 300 is mounted, the camera control unit 101 starts supplying power to the lens apparatus 300. The MIF terminal 2005 is connected to the electric contact 4002 by through wiring in the intermediate accessory device 400. Hereinafter, the electric contact 3002 and the electric contact 4002 may also be referred to as a MIF terminal 3002 and a MIF terminal 4002.

Electric contacts 3005 through 3007 and the electric contacts 4005 through 4007 are terminals for the later-described first communication. The input/output of the electric contacts 3005 through 3007 is controlled by a lens control unit 301 via a lens-side communication interface unit 302. Hereinafter, the electric contacts 3005, 3006, and 3007 may also be referred to as a DCL terminal 3005, a DLC terminal 3006, and a LCLK terminal 3007, respectively. The electric contacts 4005, 4006, and 4007 may also be referred to as a DCL terminal 4005, DLC terminal 4006, and a LCLK terminal 4007, respectively.

In a case where the lens apparatus 300 is mounted via the intermediate accessory device 400, the interface voltages of the first communication interface unit 102a and the lens-side communication interface unit 302 are set to 5.0 V (second voltage) that is the same as the voltage supplied from the VDD terminals. The second voltage is a voltage that is different from the first voltage.

Meanwhile, the interface voltage of the second/third communication interface unit 102b is set to 3.0 V. That is to say, in a case where the lens apparatus 300 is mounted to the camera body 100 via the intermediate accessory device 400, the communication voltage of the first communication and the communication voltage of the third communication are different from each other. In a case where the lens apparatus 300 is mounted to the camera body 100 via the intermediate accessory device 400, the second communication is not performed, which will be described later.

This so far has been a description of the configuration of the camera body 100 and of accessory devices that can be mounted to the camera body 100. Next, the function of the TYPE terminal 1003 will be described in detail.

An assumption will be made in the following description that the power voltage of the TYPE terminal 1003 to be pulled up in the camera body 100 is 3.3 V. Assumption will also be made that the resistance value of the resistor 125 is 100 kΩ, the resistance value of the resistor 126 is 1 kΩ, the resistance value of the resistor 222 is 33 kΩ, and the resistance value of the resistor 422 is 300 kΩ. The voltage value input to a TYPE_IN terminal is converted into digital signals of 10-bit resolution by an AD converter that is omitted from illustration.

Figure 7A:
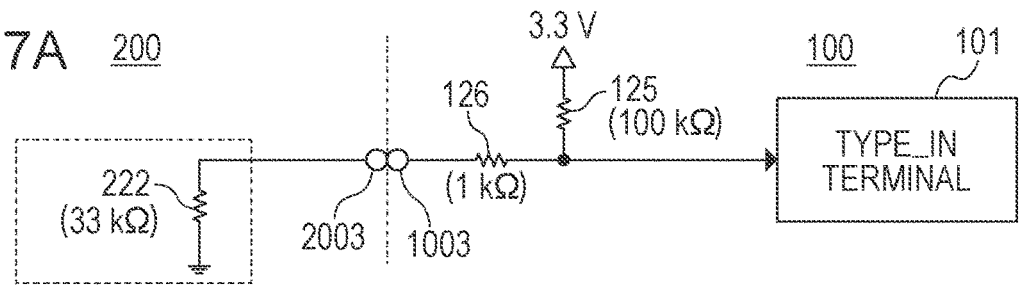
FIG. 7A is a schematic diagram of a peripheral circuit of a TYPE terminal.

FIG. 7A is an illustration of peripheral circuits of the TYPE terminal 1003 in a state where the lens apparatus 200 is mounted to the camera body 100. In this case, the value input to the TYPE_IN terminal of the camera control unit 101 is a value where the power voltage (3.3 V) has been divided by the resistor 125 and the resistor 222 and A-to-D converted, and is approximately "0x0103".

Figure 7B:
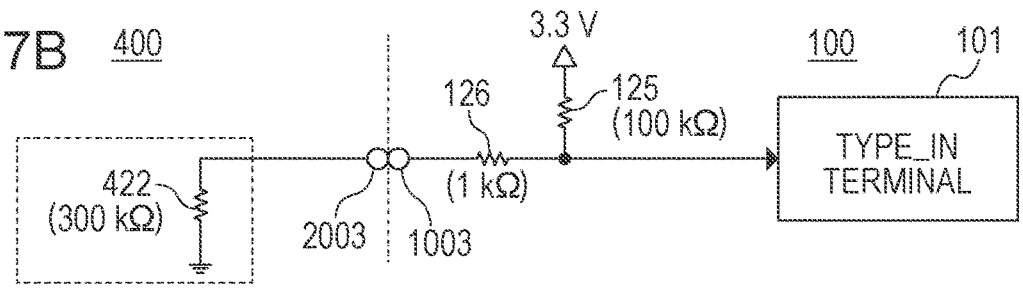
FIG. 7B is a schematic diagram of a peripheral circuit of the TYPE terminal.

Also, FIG. 7B is an illustration of peripheral circuits of the TYPE terminal 1003 in a state where the lens apparatus 300 is mounted to the camera body 100 via the intermediate accessory device 400. In this case, the value input to the TYPE_IN terminal of the camera control unit 101 is a value where the power voltage (3.3 V) has been divided by the resistor 125 and the resistor 422 and A-to-D converted, and is approximately "0x0300".

The value input to the TYPE_IN terminal can be made to differ in accordance with the type of accessory device mounted to the camera body 100, by making the resistance values of the resistor 422 of the intermediate accessory device 400 and the resistance value of the resistor 222 of the lens apparatus 200 differ. Accordingly, the camera control unit 101 can distinguish the type of accessory device mounted to the camera body 100 using the value input to the TYPE_IN terminal.

However, in a case where there is some sort of abnormality that has occurred with regard to the connection state between the TYPE terminal 1003 and the TYPE terminals 2003, an unanticipated value may be input to the TYPE_IN terminal. If the camera control unit 101 determines that there is some sort of accessory device mounted to the camera body 100 regardless of some sort of abnormality occurring in the mounting state of the accessory device, nonrated voltage may be applied to the accessory device, which should be avoided. Accordingly, a case where some sort of abnormality occurs with regard to the connection state between the TYPE terminal 1003 and the TYPE terminals 2003 will be considered with reference to FIGS. 7C through 7E.

Figure 7C:
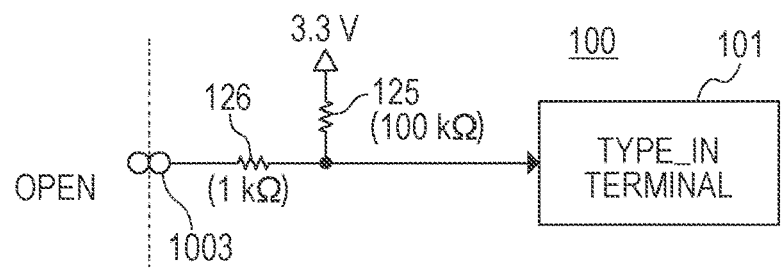
FIG. 7C is a schematic diagram of a peripheral circuit of the TYPE terminal.

FIG. 7C is an illustration of peripheral circuits of the TYPE terminal 1003 in a state where the TYPE terminal 1003 and the TYPE terminal 2003 are not in contact with each other, even though mounting of the accessory device to the camera body 100 has been completed, due to faulty contact or the like. In this case, the voltage value input to the TYPE_IN terminal is decided by the resistor 125 (100 kΩ) in the camera body 100 alone, and the value after A-to-D conversion is approximately "0x03FF".

Figure 7D:
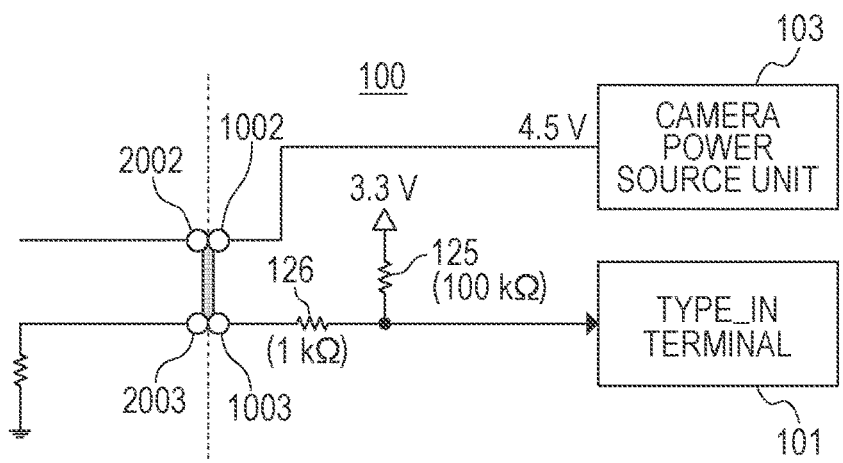
FIG. 7D is a schematic diagram of a peripheral circuit of the TYPE terminal.

FIG. 7D is an illustration of peripheral circuits of the TYPE terminal 1003 in a state where the TYPE terminal 1003 and the VBAT terminal 1002 have been short-circuited. A case will be considered here where determination of the type of accessory device mounted to the camera body 100 is performed before supply of power to the VBAT terminal 1002 and the VBAT terminal 2002. In a case where the voltages of the VBAT terminal 1002 and the VBAT terminal 2002 when power is not being supplied are the same as that of the PGND terminals, the voltage of the TYPE terminal 1003 becomes generally equal to the voltage of the PGND terminals when the TYPE terminal 1003 and the VBAT terminal 1002 are short-circuited. At this time, the value input to the TYPE_IN terminal is decided by the ratio of voltage division by the resistor 125 (100 kΩ) and the resistor 126 (1 kΩ) in the camera body 100, and is approximately "0x000A".

Next, a case will be considered where determination of the type of the accessory device mounted to the camera body 100 is performed after supply of power to the VBAT terminal 1002 and the VBAT terminal 2002. In this case, if the TYPE terminal 1003 and the VBAT terminal 1002 short-circuit, VBAT voltage (4.5 V in the present embodiment) will be applied to the TYPE terminal 1003. The value input to the TYPE_IN terminal at this time is approximately "0x03FF".

Figure 7E:
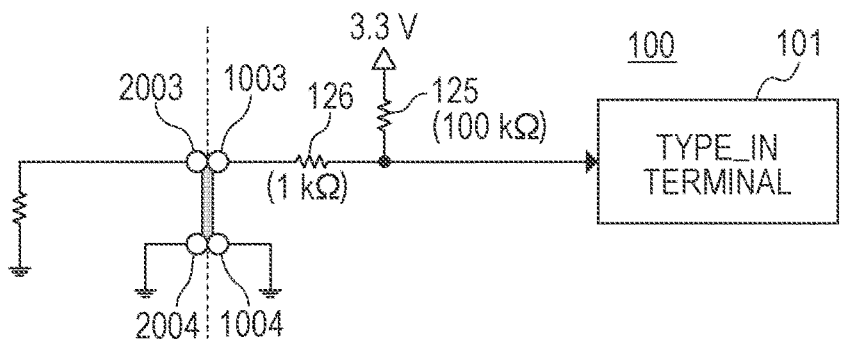
FIG. 7E is a schematic diagram of a peripheral circuit of the TYPE terminal.

FIG. 7E is an illustration of peripheral circuits of the TYPE terminal 1003 in a state where the TYPE terminal 1003 and the PGND terminal 1004 have been short-circuited. In a case where the TYPE terminal 1003 and the PGND terminal 1004 have been short-circuited, the voltage of the TYPE terminal 1003 is approximately equal to the voltage of the PGND terminal 1004 (voltage of the reference potential for VBAT voltage). At this time, the value input to the TYPE_IN terminal is decided by the ratio of voltage division by the resistor 125 (100 kΩ) and the resistor 126 (1 kΩ) in the camera body 100, and is approximately "0x000A".

As described above, in a case where some sort of abnormality occurs in the connection state of the TYPE terminal 1003 and the TYPE terminal 2003, the voltage of the TYPE terminal 1003 becomes generally equal to the VBAT voltage or the voltage of the PGND terminal 1004. Accordingly, in the present embodiment, the range of voltage of the TYPE terminal 1003 where determination is made that a lens apparatus is properly mounted to the camera body 100 is set to a voltage range that does not include the VBAT voltage and the voltage of the PGND terminal 1004. Table 1 below is a correlation table between input values of the TYPE_IN terminal and results of the camera control unit 101 for distinguishing states of mounting in the present embodiment.

| TYPE_IN | 0x0000 through 0x007F | 0x0080 through 0x017F | 0x0180 through 0x027F | 0x0280 through 0x037F | 0x0380 through 0x03FF |
|---|---|---|---|---|---|
| Determination results | Error | Lens apparatus 200 | — | Lens apparatus 300 | Error |
| Communication voltage | — | 3.0 V | — | 5.0 V | — |

It can be seen from Table 1 that the camera control unit 101 determines that the lens apparatus 200 is mounted to the camera body 100 in a case where the input value of the TYPE_IN terminal is in the range of "0x0080 through 0x017F". This range "0x0080 through 0x017F" does not include the input value of the TYPE_IN terminal in a case where the voltage of the TYPE terminal 1003 is the VBAT voltage or the voltage of the PGND terminal 1004. Accordingly, the camera control unit 101 can determine that the lens apparatus 200 has been mounted to the camera body 100 only in a case where the lens apparatus 200 is properly mounted to the camera body 100. In a case of having determined that the lens apparatus 200 has been mounted, the camera control unit 101 performs communication with the lens apparatus 200 using communication voltage 3.0 V.

In the same way, the camera control unit 101 determines that the lens apparatus 300 is mounted to the camera body 100 if the input value of the TYPE_IN terminal is in the range of "0x0280 through 0x037F". This range "0x0280 through 0x037F" does not include the input value of the TYPE_IN terminal in a case where the voltage of the TYPE terminal 1003 is the VBAT voltage or the voltage of the PGND terminal 1004. Accordingly, the camera control unit 101 can determine that the lens apparatus 300 is mounted to the camera body 100 only in a case where the lens apparatus 300 is properly mounted to the camera body 100. In a case of determination that the lens apparatus 300 is mounted, the camera control unit 101 performs communication with the lens apparatus 300 using communication voltage 5.0 V.

Thus, using the predetermined correlation between the input values of the TYPE_IN terminal and the determination results by the camera control unit 101 for the state of mounting enables the type of mounted lens apparatus to be appropriately distinguished.

In a case where the input value of the TYPE_IN terminal is in the range of "0x0000 through 0x007F", the camera control unit 101 determines that some sort of abnormality is occurring in the mounting state of the camera body 100 and the accessory device. This range "0x0000 through 0x007F" includes the input value of the TYPE_IN terminal "0x000A" in a case where the voltages of the TYPE terminal 1003 and the PGND terminal 1004 are generally equal. In this case, the camera control unit 101 does not communicate with the lens apparatus mounted to the camera body. Thus, nonrated voltage can be prevented from being applied to the accessory device in a case where an abnormality has occurred in the connection state of the TYPE terminal.

In a case where the input value of the TYPE_IN terminal is in the range of "0x0380 through 0x03FF", the camera control unit 101 determines that some sort of abnormality is occurring in the mounting state of the camera body 100 and the accessory device. This range "0x0380 through 0x03FF" includes the input value of the TYPE_IN terminal "0x03FF" in a case where the voltage of the TYPE terminal 1003 and the VBAT voltage are generally equal. In this case, the camera control unit 101 does not communicate with the lens apparatus mounted to the camera body. Thus, nonrated voltage can be prevented from being applied to the accessory device in a case where an abnormality has occurred in the connection state of the TYPE terminal.

Figure 8:
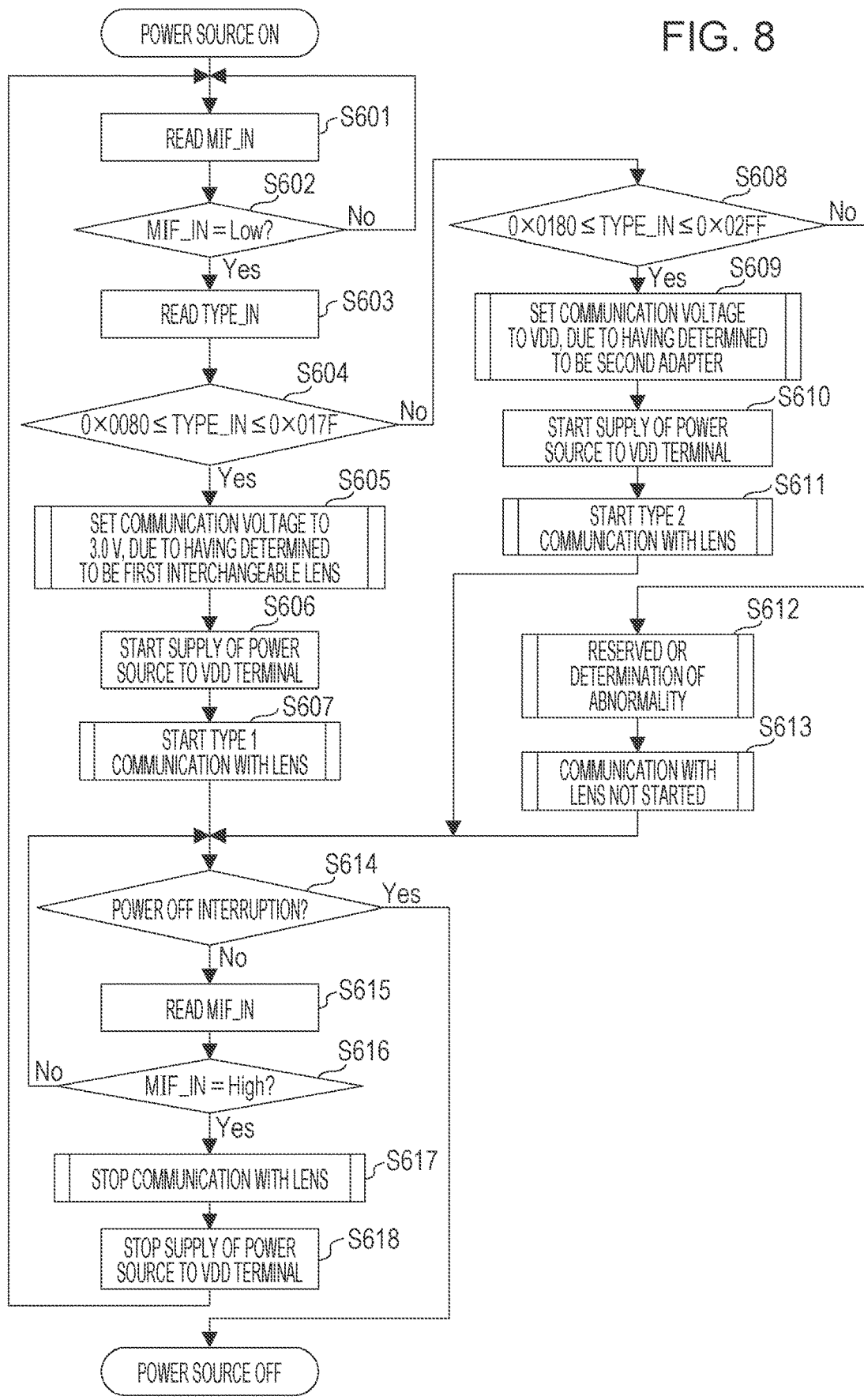
FIG. 8 is a flowchart illustrating an operation procedure of the imaging apparatus when the lens apparatus is mounted.

Next, an operation procedure of the camera body 100 will be described with reference to the flowchart in FIG. 8. This procedure is carried out following a computer program stored in the camera control unit 101. The flowchart in FIG. 8 starts from a state where the power source of the camera body 100 is turned on by operation of a power switch of the camera body 100 that is omitted from illustration. Note that steps in the flowchart are indicated by "S".

First, the camera control unit 101 obtains the voltage value of a MIF_IN terminal in S601, and stores the voltage value in a random access memory (RAM) region that is omitted from illustration.

Next, in S602, the camera control unit 101 determines whether or not the voltage value of the MIF_IN terminal stored in S601 is at a Low level. In a case where the voltage value of the MIF_IN terminal is not at the Low level, no lens apparatus is mounted to the camera body 100, and therefore the procedure returns to S601 (No in S602). In a case where the voltage value of the MIF_IN terminal is at the Low level, determination is made that a lens apparatus is mounted to the camera body 100, and the processing proceeds to S603.

In S603, the camera control unit 101 obtains the voltage value of TYPE_IN, and stores the voltage value in a RAM region omitted from illustration.

In S604, determination is made regarding whether the value of TYPE_IN stored in S603 is within the range of more than or equal to 0x0080 and less than or equal to 0x017F. If Yes is returned in S604, the camera control unit 101 determines that the lens apparatus that is mounted is the lens apparatus 200. In this case, the processing proceeds to S605.

In S605, the camera control unit 101 controls the power source switching unit 104 to supply the power supply voltage of 3.0 V to the first communication interface unit 102a.

Thereafter, power supply to the VDD terminal 1001 by the camera power source unit 103 is started in S606, and communication with the lens apparatus 200 by the first communication is started in S607.

Meanwhile, in a case where No is returned in S604, the processing proceeds to S608. In S608, determination is made whether the value of TYPE_IN stored in S603 is within the range of more than or equal to 0x0180 and less than or equal to 0x02FF. If Yes is returned in S608, the camera control unit 101 determines that the lens apparatus that is mounted is the lens apparatus 300. In this case, the processing proceeds to S609.

In S609, the camera control unit 101 controls the power source switching unit 104 to supply the power supply voltage of 5.0 V to the first communication interface unit 102a.

Then, power supply to the VDD terminal 1001 by the camera power source unit 103 is started in S610, and in S611, the first communication with the lens apparatus 300 is started.

Meanwhile, in a case where No is returned in S608, the processing proceeds to S612. In this case, the camera control unit 101 determines that the accessory device that is mounted is an accessory device that the camera body 100 cannot control, or that an abnormality is occurring in the mounting state, and the processing proceeds to S613.

In S613, the camera control unit 101 does not perform communication with the accessory, and makes a display on a display unit, omitted from illustration, provided on the camera body 100, indicating that a connection error has occurred.

Determination of whether the power source of the camera body 100 is turned off, by an operation of the power switch of the camera body 100, is made in S614. If determination is made that the power switch is turned off, processing for turning the power source off is performed. Otherwise, the processing proceeds to S615.

In S615, the camera control unit 101 reads in the voltage value at the MIF_IN terminal, and stores the voltage value in a RAM region that is omitted from illustration.

In S616, determination is made regarding whether the voltage value of MIF_IN stored in S615 is equivalent to a High level. If the voltage value of MIF_IN is High, determination is made that the lens apparatus mounted to the camera body 100 has been detached. Meanwhile, in a case where the voltage value of MIF_IN is Low, determination is made that the lens apparatus remains mounted, and the processing returns to S614.

In S617, the camera control unit 101 stops communication with the lens apparatus, and in S618, power supply to the VDD terminal 1001 by the camera power source unit 103 is stopped. Thereafter, the processing proceeds to S601.

Next, communication between the camera body 100 and an accessory device mounted to the camera body 100 will be described.

First, the first communication will be described. The first communication is a type of communication between the camera body 100 and a lens apparatus mounted to the camera body 100. The first communication is performed using the LCLK terminals, the DCL terminals, and the DLC terminals. The first communication is carried out using a clock-synchronous serial communication method. The first communication may be performed using an asynchronous serial communication method. It that case, the LCLK terminal is used as a terminal to notify the lens apparatus of a data transmission request from the camera body 100.

The lens apparatus 200 and the lens apparatus 300 both support the first communication. However, the communication voltage for the first communication differs between the lens apparatus 200 and the lens apparatus 300, as described earlier.

The camera body 100 transmits a control command for controlling the lens apparatus, to the lens apparatus by the first communication. The control command includes commands for driving the driving units (omitted from illustration) of the lens apparatus. Examples of driving units of the lens apparatus include a focus lens, a zoom lens, and a diaphragm.

The lens apparatus that has received the control command transmitted by the first communication performs operation in accordance with the command. In response to the control command, the lens apparatus transmits information relating to the state of itself (state information) to the camera body 100, by the first communication. The information relating to the state as used here includes information about a position of focus lens, a focal length, and an aperture value.

Thus, the first communication is communication primarily for controlling the lens apparatus.

Next, the second communication will be described. The second communication is a type of communication between the camera body 100 and the lens apparatus 200 mounted to the camera body 100, and is asynchronous communication using the DLC2 terminals 1009 and 2009. Since the lens apparatus 300 does not have a DLC2 terminal, the second communication is not performed when the lens apparatus 300 is mounted to the camera body 100. Accordingly, the DLC2 terminal 1009 is not used in a case where the lens apparatus 300 is mounted to the camera body 100.

In the second communication, the lens apparatus 200 serves as the communication master, and transmits the optical data at the lens apparatus 200, such as a position of the focus lens, a position of the zoom lens, an aperture value, a state of the image stabilization lens, to the camera body 100. Types and the order of data that the lens apparatus 200 transmits to the camera body 100 using the second communication is specified by the camera body 100 using the first communication.

Figure 9:
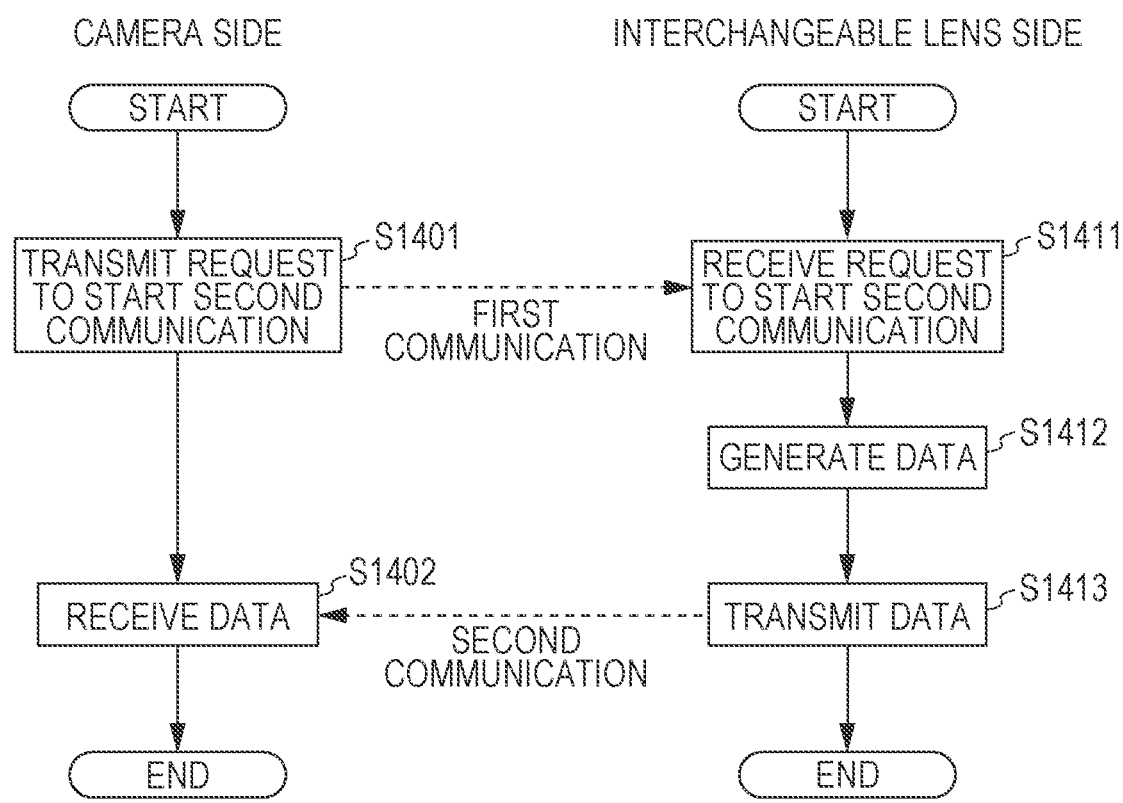
FIG. 9 is a flowchart illustrating a second communication procedure.

Now, a procedure of the second communication will be described with reference to FIG. 9. The flowchart in FIG. 9 starts with the timing at which imaging control is started. Note that steps are represented by S in the flowchart.

In S1401, the camera body 100 transmits to the lens apparatus 200 a start request requesting the start of the second communication, using the first communication. The start request transmitted in S1401 includes registration communication commands in which the type of data that the camera body 100 desires to receive from the lens apparatus 200 using the second communication, and the order of reception are registered beforehand.

The lens apparatus 200 receives the start request from the camera body 100 in S1411. In S1412, the lens apparatus 200 generates the types of data specified by the registration communication command included in the start request, in the specified order.

In S1413, the lens apparatus 200 transmits the data generated in S1412 to the camera body 100 using the second communication. That is to say, the lens apparatus 200 transmits the data generated in S1412 to the camera body 100 using the DLC2 terminal 2009.

The camera body 100 receives the data transmitted from the lens apparatus 200 by the second communication in S1402.

In a case where imaging control is started again after S1402 or S1413, the control illustrated in FIG. 9 is started again.

Thus, the start request for the second communication is made by the first communication, and data transmission from the lens apparatus 200 to the camera body 100 by the second communication is performed using the DLC2 terminal 2009. Accordingly, by performing the second communication using the DLC2 terminal 2009 provided separately from the electric contacts for the first communication, optical data can be transmitted from the lens apparatus 200 to the camera body 100 without interfering with other communication that needs to be performed by the first communication.

Since the start request for the second communication is given using the first communication, the second communication cannot be performed if the first communication has not been established.

Next, the third communication will be described. The third communication is communication among the lens apparatus 200, the intermediate accessory device 400, the intermediate accessory device 500, and the camera body 100, and is asynchronous communication using the DCA terminals and the CS terminals.

Since, as described earlier, the lens apparatus 300 does not have a DCA terminal or a CS terminal, the camera body 100 and the lens apparatus 300 do not perform the third communication in a case where the lens apparatus 300 is mounted to the camera body 100 via the intermediate accessory device 400. However, in this case, the camera body 100 and the intermediate accessory device 400 may perform the third communication.

In the third communication, the communication master is the camera body 100 and the communication slaves are the lens apparatus 200, the intermediate accessory device 400, and the intermediate accessory device 500. Although FIG. 5 illustrates only one intermediate accessory device 500 being mounted between the camera body 100 and the lens apparatus 200, there are cases where multiple intermediate accessory devices are mounted between the camera body 100 and the lens apparatus 200. Accordingly, in the third communication, there are cases where multiple communication slaves are serially connected to one communication master. Therefore, in the third communication, communication can be performed in a broadcast communication mode where the camera body 100 transmits signals to the multiple accessories at the same time, and a peer-to-peer (P2P) mode where a particular slave is specified and communication is performed.

The DCA terminals function as terminals to transmit and receive data in both the broadcast communication mode and the P2P mode in the third communication. Meanwhile, the functions of the CS terminals differ between the broadcast communication mode and the P2P mode. Hereinafter, the functions of the CS terminals in the broadcast communication mode and the P2P mode will be described, by way of an example of a case where the lens apparatus 200 is mounted to the camera body 100 via the intermediate accessory device 500.

Figure 10:
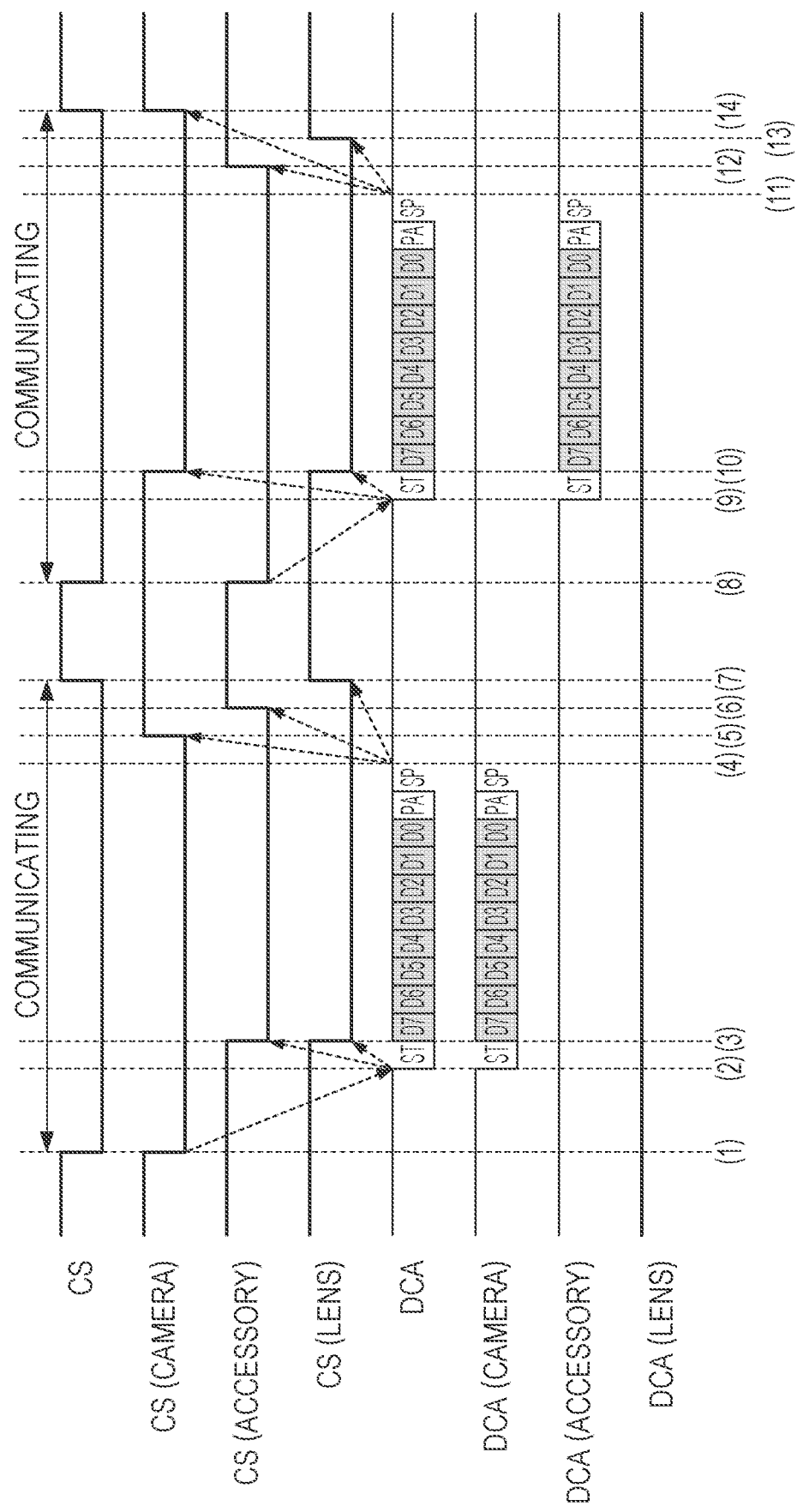
FIG. 10 is a diagram describing a broadcast communication mode in a third communication.

FIG. 10 illustrates communication control timing in broadcast communication exchanged among the camera control unit 101, the lens control unit 201, and the accessory control unit 501. The CS terminals of the camera control unit 101, the lens control unit 201, and the accessory control unit 501, are expressed as CS (camera), CS (lens), and CS (accessory), respectively. Also, the outputs of the DCA terminals of the camera control unit 101, the lens control unit 201, and the accessory control unit 501, are expressed as DCA (camera), DCA (lens), and DCA (accessory), respectively. A signal waveform of a signal line made up of the CS terminals (CS signal line) and a signal waveform of a signal line made up of the DCA terminals (DCA signal line) are respectively denoted by CS and DCA. FIG. 10 illustrates a case of the accessory control unit 501 performing broadcast communication to the camera control unit 101 and the lens control unit 201 in response to broadcast communication from the camera control unit 101 to the lens control unit 201 and the accessory control unit 501.

At the timing of (1) shown in FIG. 10, the camera control unit 101 as the communication master outputs Low to the CS terminals, to notify the lens control unit 201 and the accessory control unit 501 as communication slaves that broadcast communication is to be started. Next, at the timing of (2) shown in FIG. 10, the camera control unit 101 outputs data to be transmitted, to the DCA terminals.

Upon detecting a start bit ST of the signal input from their DCA terminals at the timing of (3) in FIG. 10, the lens control unit 201 and the accessory control unit 501 start Low output to their CS terminals. At this point, since the camera control unit 101 is already outputting Low to the CS terminal at the timing of (1), the level on the CS signal line is unchanged.

When output of the data to be transmitted has been completed up to the stop bit SP at the timing of (4) in FIG. 10, the camera control unit 101 resets the Low output to the CS terminal at the timing of (5). Meanwhile, upon receiving up to the stop bit SP, the lens control unit 201 and the accessory control unit 501 perform analysis of the received data and internal processing relating to the received data. In a case where the internal processing has been completed, and preparation has been made to receive the next data, the lens control unit 201 and the accessory control unit 501 reset the Low output to their CS terminals at the timing of (6) and (7), respectively.

The amount of time required for the analysis of the received data and the internal processing relating to the received data differs depending on the processing abilities of the individual control units. Accordingly, each control unit needs to know the timing at which the internal processing relating to the received data has been completed at all of the other microprocessors.

The CS terminals in the present embodiment are open-type output terminals, as mentioned earlier. Accordingly, when all of the camera control unit 101, the lens control unit 201, and the accessory control unit 501 reset the Low output to their respective CS terminals, the level on the CS signal line goes to High. That is to say, the control units that are involved in the broadcast communication can determine that preparation for the next communication has been made at the other control units, by confirming that the level of the CS signal line has gone to High, and accordingly can appropriately perform the next communication.

At the timing of (8), the accessory control unit 501 starts Low output to the CS terminal, to notify the camera control unit 101 and the lens control unit 201 that broadcast communication is to be started. Next, the accessory control unit 501 outputs data to be transmitted to the DCA terminal at the timing of (9).

Upon detecting a start bit ST input from their DCA terminals, the camera control unit 101 and the lens control unit 201 start Low output to their CS terminals at the timing of (10). Since the accessory control unit 501 has already started Low output to the CS terminal at this point, the level of the CS signal line is unchanged. After completing output of a stop bit SP at the timing of (11), the accessory control unit 501 resets the Low output to the CS terminal at the timing of (12).

After receiving a stop bit SP input from their DCA terminals, the camera control unit 101 and the lens control unit 201 perform analysis of the received data and internal processing associated with the received data. After preparation to receive the next data has been made, the camera control unit 101 and the lens control unit 201 reset the Low output to their CS terminals, at the timing of (13) and (14), respectively.

Thus, the CS terminals serve in broadcast communication to make notification of timing to start broadcast communication and timing that preparation for reception has been completed at all microprocessors, by change in voltage.

Figure 11:
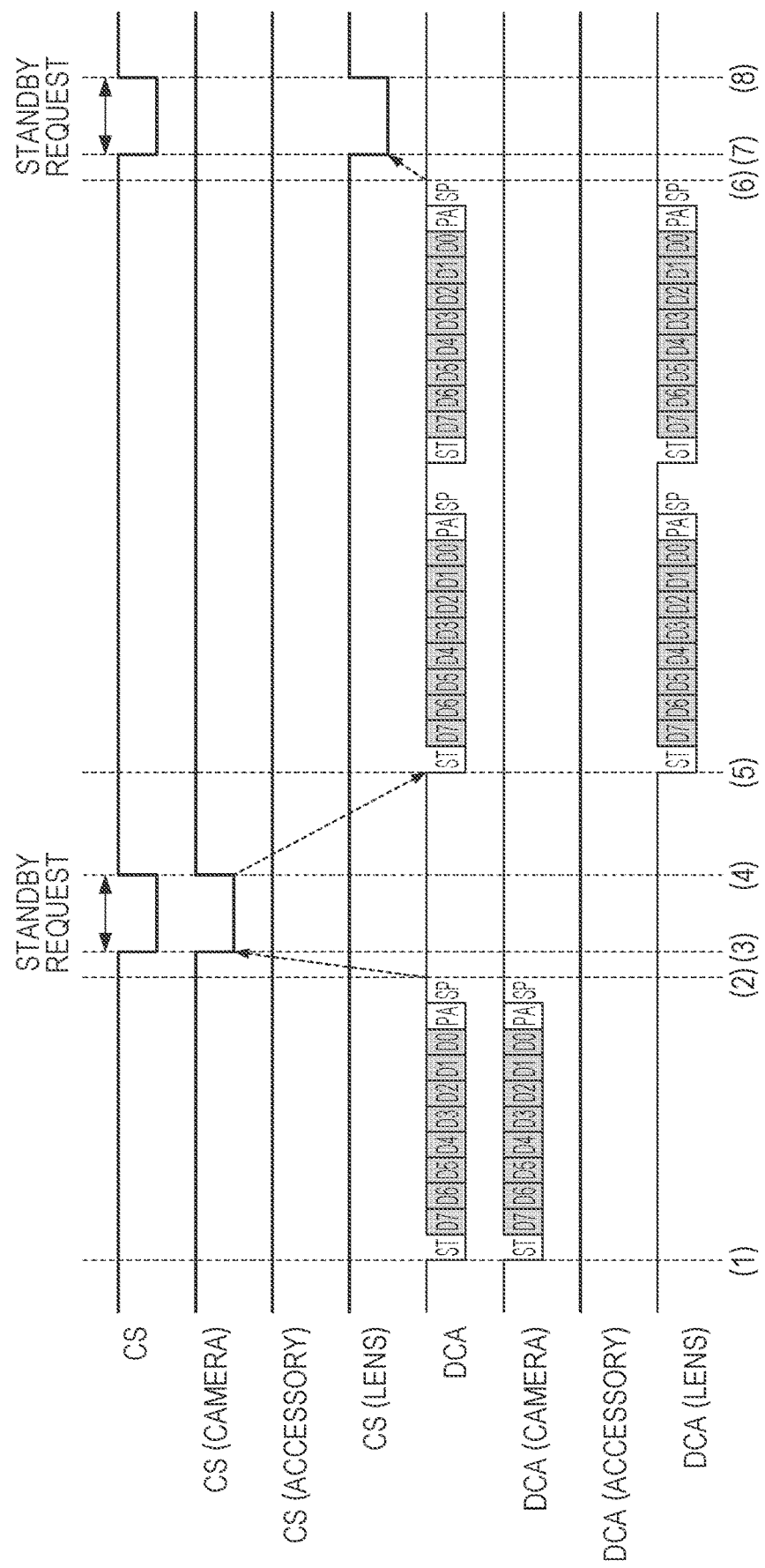
FIG. 11 is a diagram describing a P2P communication mode in the third communication.

Next, the functions of the CS terminal in the P2P communication will be described. FIG. 11 illustrates communication timing on the P2P communication exchanged between the camera control unit 101, the lens control unit 201, and the accessory control unit 501. A description will be given taking an example in which byte worth of data is transmitted from the camera control unit 101 to the lens control unit 201, and the lens control unit 201 transmits two bytes worth of data to the camera control unit 101 in response to that data.

First, the camera control unit 101 uses the DCA terminal to transmit a command to the lens control unit 201 to cause particular data to be transmitted, at the timing of (1) shown in FIG. 11. After the timing of (2) where output has been completed up to a stop bit SP, the camera control unit 101 starts Low output to the CS terminal at the timing of (3). The camera control unit 101 performs preparation to receive data while outputting Low to the CS terminal, and at the timing of (4) where preparation has been made, resets the Low output to the CS terminal.

Meanwhile, after detection of the Low signal at the CS terminal output by the camera control unit 101, the lens control unit 201 analyzes the command received from the camera control unit 101, and performs internal processing relating to this command. After confirmation that the Low output of the CS terminal has been reset, the lens control unit 201 transmits data, corresponding to the command received from the camera control unit 101, from the DCA terminal. After the timing of (6) where output has been completed up to output of a stop bit SP of the second byte, the lens control unit 201 starts Low output to the CS terminal at the timing of (7).

Subsequently, the lens control unit 201 resets Low output to the CS terminal at the timing of (8) where preparation for reception of the next data has been made. The accessory control unit 501, which has not been specified as a communication party in the P2P communication is not involved in operation of the CS signal line and the DCA signal line whatsoever.

Thus, in the P2P mode, the CS terminals notify the timing at which data transmission has been completed at the data transmitting side device, and the timing at which preparation for data reception has been completed at the data receiving side device, by change in voltage value.

As described above, in the third communication, the functions of the CS terminals are different between the broadcast communication mode and the P2P mode. This realizes the broadcast communication mode and the P2P mode using only two signal lines. Further, transmission and reception of data in the third communication is performed by the DCA terminals having a CMOS type input/output interface. Accordingly, high-speed communication can be realized even if the output interfaces of the CS terminals, which are used simply for notification of various types of timings in the third communication, are of the open type.

Next, communication voltage of the first through third communication will be described. In a case where the lens apparatus 200 is mounted to the camera body 100, the first communication, the second communication, and the third communication can be performed, as described earlier. Meanwhile, in a case where the lens apparatus 300 is mounted to the camera body 100, the first communication and the third communication can be performed. That is to say, the case where the lens apparatus 200 is mounted to the camera body 100 has more types of communication to be performed as compared to a case where the lens apparatus 300 is mounted. Accordingly, the communication voltage in the case where the lens apparatus 200 is mounted to the camera body 100 is preferably lower from the perspective of reducing power consumption. To this end, in the present embodiment, the communication voltage for the first communication in a case where the lens apparatus 200 has been mounted (3.0 V) is set to be lower than the communication voltage in a case where the lens apparatus 300 has been mounted (5.0 V).

Further, the communication voltage of the third communication is the same between a case where the lens apparatus 200 has been mounted and a case where the lens apparatus 300 has been mounted in the present embodiment, and therefore the configuration of the second/third communication interface unit 202b can be simplified. In this case, the communication voltage of the third communication preferably is equal to the lower one of the communication voltages of the first communication in a case where the lens apparatus 200 has been mounted and of the first communication in a case where the lens apparatus 300 has been mounted. Accordingly, the power consumption for performing the third communication can be reduced.

Next, the arrangement order of the electric contacts will be described, in view of the circuit configurations and the roles of the electric contacts of the camera body 100, the lens apparatus 200, and the intermediate accessory devices 400 and 500.

As described above, drive control and obtaining state information on the lens apparatus 200 and the lens apparatus 300 is performed by the first communication. Accordingly, even if the second communication and the third communication cannot be performed due to a faulty contact between the electric contacts, primary control of the lens apparatus 200 and the lens apparatus 300 can be performed as long as the first communication has been established. Conversely, if the first communication becomes unavailable due to a faulty contact between the electric contacts, the camera body 100 can no longer control the lens apparatus 200 or the lens apparatus 300. Accordingly, it can be said that the electric contacts for the first communication are more important in comparison with the electric contacts for the second communication and the third communication.

Therefore, in the present embodiment, the electric contacts are arranged in such a manner that the amount of wear of the first camera-side electric contact group due to mounting and detaching accessory devices is smaller than that of the electric contacts 1009 through 1011 for the second communication or the third communication. This will be described with reference to FIGS. 4A and 4B.

When the lens apparatus 200 is mounted to the camera body 100, the lens apparatus 200 moves (rotates) from the position illustrated in FIG. 4B to the position illustrated in FIG. 4A, with respect to the camera body 100. In the operation, each of the electric contacts held by the camera-side contact holding member 154 comes into contact with the electric contacts held by the accessory-side contact holding member 254 at least once. The amount of wear increases as the number of times that an electric contact comes into contact with the electric contacts held by the accessory-side contact holding member 254 increases.

The timings at which the electric contacts 1001 through 1012 start to come into contact with the electric contacts held by the accessory-side contact holding member 254 during a period from when mounting of the lens apparatus 200 to the camera body 100 is started to when the mounting is completed differ among them.

For example, the DGND terminal 1012 comes into contact with an electric contact held by the accessory-side contact holding member 254 at the earliest among all the electric contacts 1001 through 1012 when the lens apparatus 200 is mounted to the camera body 100. The DGND terminal 1012 comes into contact with the electric contacts 2005 through 2012 by when mounting of the lens apparatus 200 is complete, and therefore the number of times that the DGND terminal 1012 comes into contact with the electric contacts held by the accessory-side contact holding member 254 is eight. Meanwhile, the CS terminal 1011 that comes into contact with the electric contacts held by the accessory-side contact holding member 254 next after the DGND terminal 1012 comes into contact with the electric contacts 2005 through 2011 by when the mounting of the lens apparatus 200 is complete, and therefore the number of times that the CS terminal 1011 comes into contact with electric contacts held by the accessory-side contact holding member 254 is seven, which is less than that of the DGND terminal 1012.

Thus, among the electric contacts, the higher the number of times of contact with the electric contacts held by the accessory-side contact holding member 254 the earlier the timing is of starting to come into contact with the electric contacts held by the accessory-side contact holding member 254 when the lens apparatus 200 is mounted to the camera body 100.

In the arrangement of electric contacts according to the present embodiment, when the lens apparatus 200 is mounted, the electric contacts 1009 through 1011 that are used for the second or third communication come into contact with electric contacts on the accessory-side contact holding member 254 before the electric contacts 1006 through 1008 that are used for the first communication.

According to this arrangement of the electric contacts, the amount of wear of the first camera-side electric contact group for the first communication can be reduced in comparison with that of the electric contacts 1009 through 1011 that are used for the second or third communication. Thus, an occurrence of a communication failure due to wear of the electric contacts can be reduced.

It can be said that the electric contacts 2006 through 2008, which are the first lens-side electric contact group are disposed at a position where the amount of wear when the lens apparatus 200 is mounted to and detached from the camera body 100 is greater as compared to the electric contacts 2009 through 2011. However, since multiple types of camera accessories are mounted to the camera body 100 as illustrated in FIG. 1, and therefore the amount of wear of the electric contacts at the lens apparatus 200 is smaller than that at the camera body 100. Accordingly, in the present embodiment, the electric contacts are arranged in such a manner that the amount of wear of the first camera-side electric contact group is smaller, in view of the electric contacts at the camera body 100 side where the electric contacts wear more easily.

Figure 12A:
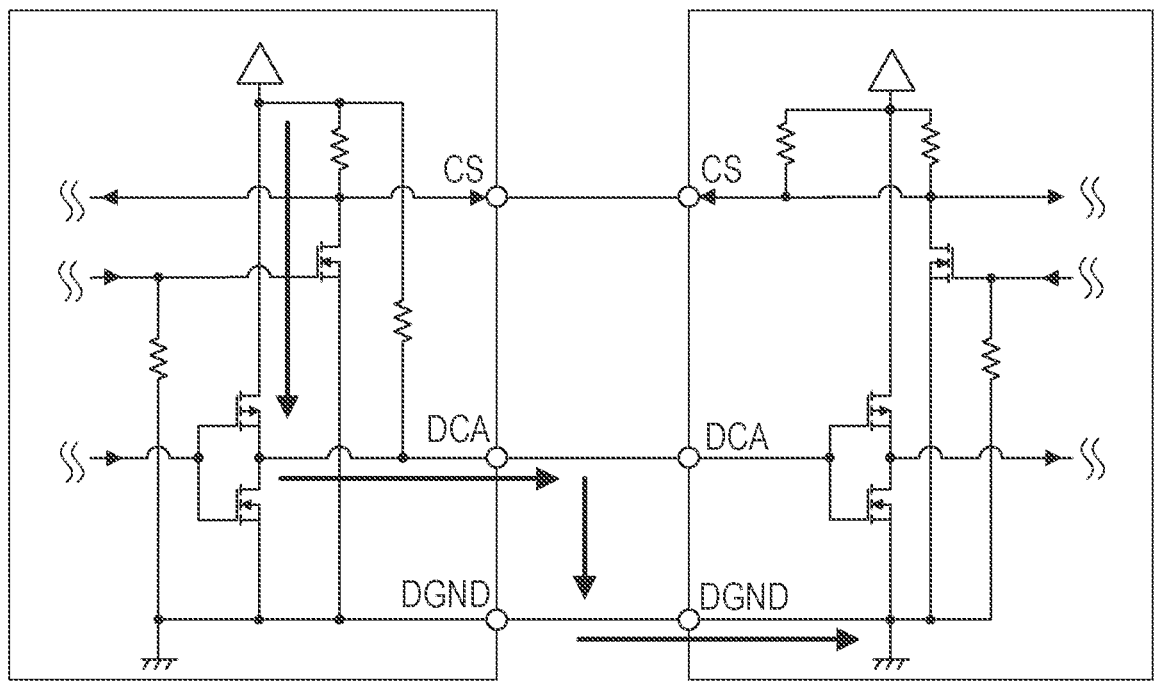
FIG. 12A is a diagram describing a case where a DGND terminal and a terminal adjacent to the DGND terminal are short-circuited.
Figure 12B:
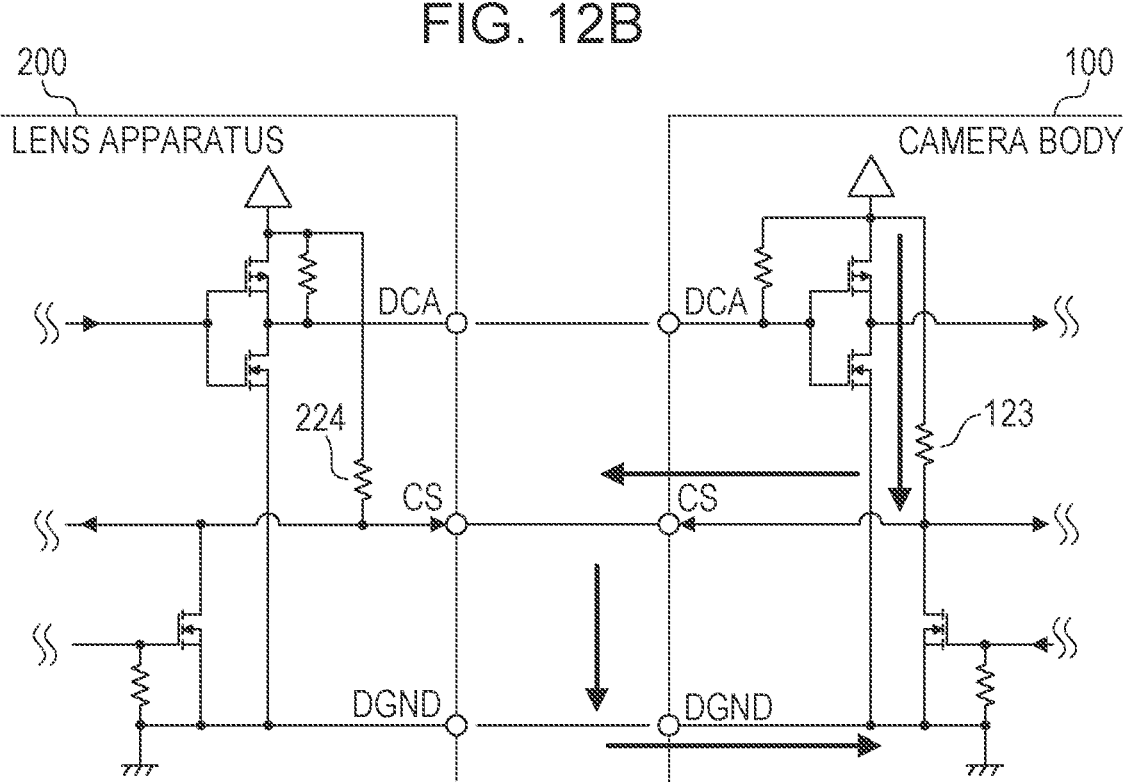
FIG. 12B is a diagram describing a case where the DGND terminal and the terminal adjacent to the DGND terminal are short-circuited.

Next, the order of the array of the DGND terminal, CS terminal, and DCA terminal will be described with reference to FIGS. 12A and 12B.

First, a case will be considered as a comparative example, in which the DCA terminal is disposed adjacent to the DGND terminal. The peripheral circuits of the CS terminal, the DCA terminal, and the DGND terminal in this case are illustrated in FIG. 12A. The DCA terminal is a CMOS type input/output interface terminal, as described earlier. In a case where the DGND terminal and the DCA terminal are short-circuited due to an electroconductive foreign substance being lodged between the camera body and the accessory device in FIG. 12A or the like, and when High level is output to the DCA terminal, a large current will flow from the DCA terminal toward the DGND terminal. This is because the resistance of the CMOS type interface is low when High level is output. In this case, a great current may flow into the accessory device and the camera body that is performing the third communication, and the internal circuits is affected.

Meanwhile, the CS terminal is disposed between the DCA terminal and the DGND terminal in the present embodiment. FIG. 12B illustrates the peripheral circuits of the CS terminal, the DCA terminal, and the DGND terminal of the camera body 100 and the lens apparatus 200 serving as an accessory device according to the present embodiment. As described above, the CS terminal is an open type output terminal. Accordingly, even if the DGND terminal and the CS terminal short-circuit in FIG. 12B, only a small current will flow to the DGND terminal. This is because the CS terminal is pulled up to the power potential via a resistor.

Thus, this arrangement where the electric contact adjacent to the DGND terminal is the CS terminal which is an open type output terminal enables electrical effects on the internal circuits of the accessory device and the camera body 100 to be reduced in a case where electric contacts are connected to each other unintentionally.

The DLC2 terminal is disposed adjacent to the electric contact group for the first communication in the present embodiment. That is to say, the DLC2 terminal is disposed adjacent to the LCLK terminal. The reason for this will be described by way of comparison with a case where the CS terminal or the DCA terminal for the first communication is disposed. Assumption will be made in the following that the lens apparatus 300 is mounted to the camera body via an intermediate accessory device that is capable of the third communication with the camera body. Accordingly, the communication voltage of the first communication is 5.0 V. The communication voltage of the third communication is 3.0 V. The second communication is not performed.

Figure 13A:
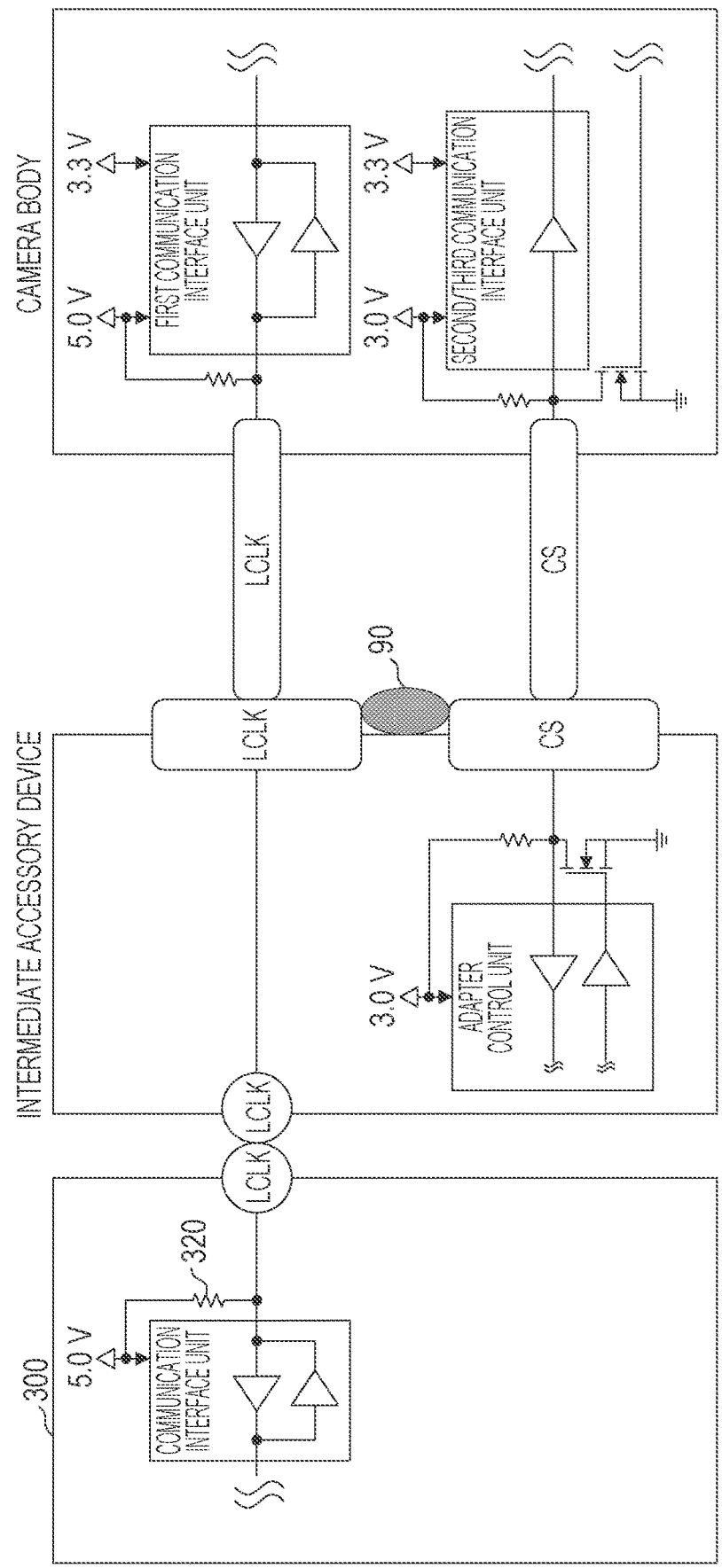
FIG. 13A is a diagram describing a case where a LCLK terminal and a terminal adjacent to the LCLK terminal are short-circuited.

FIG. 13A illustrates the peripheral circuits of the LCLK terminal and the CS terminal in a case where the CS terminal is disposed adjacent to the LCLK terminal. The LCLK terminal is pulled up to 5.0 V, which is the communication voltage for the first communication, at each of the camera body 100 and the lens apparatus 300. Meanwhile, the CS terminal is pulled up to 3.0 V, which is the communication voltage for the third communication at the camera body 100 and the intermediate accessory device. Now, if an electroconductive foreign substance 90 is lodged between the LCLK terminal and the CS terminal, and the LCLK terminal and the CS terminal are short-circuited, voltage exceeding 3.0 V may be applied to the CS terminal. At this time, voltage exceeding the operating voltage (3.0 V) will be applied to the second/third communication interface unit 202b of the camera body 100 and the accessory control unit of the intermediate accessory device, which is undesirable.

Figure 13B:
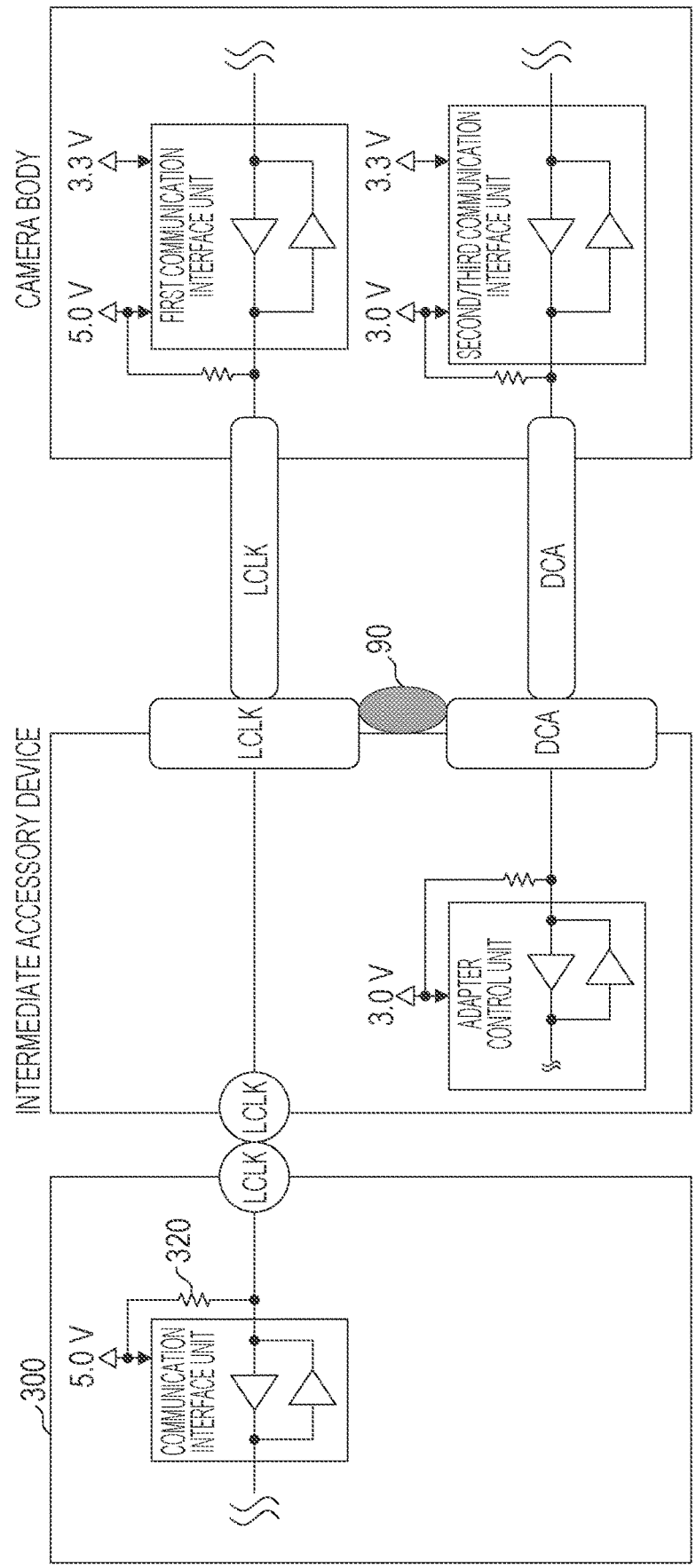
FIG. 13B is a diagram describing a case where the LCLK terminal and a terminal adjacent to the LCLK terminal are short-circuited.

FIG. 13B illustrates the peripheral circuits of the LCLK terminal and the DCA terminal in a case where the DCA terminal is disposed adjacent to the LCLK terminal. The DCA terminal is pulled up to 3.0 V, which is the communication voltage for the third communication at the camera body 100 and the intermediate accessory device. Now, if an electroconductive foreign substance 90 is lodged between the LCLK terminal and the DCA terminal, and the LCLK terminal and the DCA terminal are short-circuited, voltage exceeding 3.0 V may be applied to the DCA terminal. At this time, voltage exceeding the operating voltage (3.0 V) will be applied to the second/third communication interface unit 202b of the camera body 100 and the accessory control unit of the intermediate accessory device, which is undesirable.

FIG. 13C illustrates the peripheral circuits of the LCLK terminal and the DLC2 terminal in a case where the lens apparatus 300 is mounted to the camera body 100 via the intermediate accessory device 400. Since the second communication is not performed at this time, the DLC2 terminal is not used. Therefore, even if the LCLK terminal and the DLC2 terminal are short-circuited, the internal circuits of the camera body 100 and intermediate accessory device 400 are not easily affected in the present embodiment.

In a case where the lens apparatus 200 is mounted to the camera body 100, the second communication is performed, but the communication voltage of the first communication and the second communication is 3.0 V for both. Accordingly, even in a case where the LCLK terminal and the DLC2 terminal are short-circuited, excessive voltage will not be applied to the internal circuits of the camera body 100 or the lens apparatus 200.

According to the above, it can be said the electric contact adjacent to the electric contact group for first communication is the DLC2 terminal that is not used when the lens apparatus 300 is mounted.

Further, in a case where the lens apparatus 200 is mounted to the camera body 100, the second communication and the third communication can be performed at the same time. In this case, even if the DLC2 terminal and the DCA terminal are short-circuited, excessive voltage will not be applied to the internal circuits of the camera body 100 or the lens apparatus 200, since the communication voltage for the second communication and the third communication is 3.0 V. Accordingly, the CS terminal or the DCA terminal is preferably adjacent to the DLC2 terminal. Also, since the DLC2 terminal is disposed between the LCLK terminal and the CS terminal or the DCA terminal in this case, short-circuiting of the LCLK terminal and the CS terminal or the DCA terminal can be made to occur less easily. Accordingly, short-circuiting among electric contacts that perform communication at different communication voltages can be prevented when the lens apparatus 300 is mounted to the camera body 100 via the intermediate accessory device 400.

Although a preferred embodiment of the present invention has been described, the present invention is not restricted to this embodiment, and various modifications and alterations may be made within the scope of the essence thereof. Although an example has been described in the present embodiment where the camera body 100 has the electric contacts 1009 through 1011 as the second camera-side electric contact group, and the second communication and the third communication can be performed with mounted accessory devices, this is not restrictive. For example, the camera body 100 may have just the electric contacts 1010 and 1011 as the second camera-side electric contact group. In this case, the camera body 100 will not have the electric contact 1009. More specifically, the camera body 100 will not support the above-described second communication.

Alternatively, the camera body 100 may have just the electric contact 1009 as the second camera-side electric contact group. In this case, the camera body 100 will not have the electric contacts 1010 and 1011. More specifically, the camera body 100 will not support the above-described third communication.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An imaging apparatus to which a lens apparatus is detachably mountable, the imaging apparatus comprising:
    a mount unit; and
    a contact holding member provided to the mount unit where a plurality of electric contacts are arrayed,
    wherein the plurality of electric contacts includes:
    a first power contact configured to supply first power,
    a second power contact configured to supply second power,
    a first electric contact group configured to be used for first communication, and
    a second electric contact group consisting of 2 electric contacts and configured to be used for communication that is different from the first communication, wherein the first electric contact group consists of:
a first electric contact configured to output a clock signal,
a second electric contact configured to transmit data synchronously with the clock signal, and
a third electric contact configured to receive data transmitted synchronously with the clock signal,
wherein the contact holding member has two tiers each of which holds electric contacts included in the plurality of electric contacts,
wherein the first electric contact group and the second electric contact group are held on one of the two tiers and the first power contact and the second power contact are held on the other of the two tiers,
wherein, where a direction of rotation of the lens apparatus with respect to the imaging apparatus when mounting the lens apparatus to the imaging apparatus directly is a first direction, the second electric contact group, the first electric contact group, the first power contact, and the second power contact are arrayed in the following order: the second electric contact group, the first electric contact group, the second power contact, and the first power contact in the first direction, and
wherein the second electric contact and the third electric contact are disposed on an opposite side of the second electric contact group with respect to the first electric contact.

2. The imaging apparatus according to claim 1, wherein the imaging apparatus uses the first electric contact group in transmitting a control command to control the lens apparatus mounted to the imaging apparatus.

3. The imaging apparatus according to claim 1, wherein the second electric contact group includes:
an electric contact configured to transmit and receive data, and
an electric contact configured to be used for notification of timing relating to the communication using the second electric contact group.

4. The imaging apparatus according to claim 3, wherein, in a state where a plurality of accessories are mounted to the imaging apparatus, the imaging apparatus communicates with the plurality of accessories using the second electric contact group.

5. The imaging apparatus according to claim 4,
wherein the communication using the second electric contact group is broadcast communication where data is transmitted from one of the plurality of accessories and the imaging apparatus to all the other of the plurality of accessories and the imaging apparatus, and
wherein the timing relating to the communication using the second electric contact group includes a timing of starting the broadcast communication.

6. The imaging apparatus according to claim 4,
wherein the communication using the second electric contact group is broadcast communication where data is transmitted from one of the plurality of accessories and the imaging apparatus to all the other of the plurality of accessories and the imaging apparatus, and
wherein the timing relating to the communication using the second electric contact group includes a timing of completing preparation for reception of data at all the other of the plurality of accessories and the imaging apparatus.

7. The imaging apparatus according to claim 4,
wherein the communication using the second electric contact group is peer-to-peer communication performed between one of the plurality of accessories and the imaging apparatus, and
wherein the timing relating to the communication using the second electric contact group includes a timing of completing transmission of data at a side of the one of the plurality of accessories or the imaging apparatus transmitting data in the peer-to-peer communication.

8. The imaging apparatus according to claim 4,
wherein the communication using the second electric contact group is peer-to-peer communication performed between one of the plurality of accessories and the imaging apparatus, and
wherein the timing relating to the communication using the second electric contact group includes a timing of completing preparation for reception of data at a side of the one of the plurality of accessories or the imaging apparatus receiving data in the peer-to-peer communication.

9. The imaging apparatus according to claim 1,
wherein the second electric contact group includes an electric contact configured to receive data transmitted from the lens apparatus, and
wherein the data transmitted from the lens apparatus using the second electric contact group is data specified by the imaging apparatus by the communication using the first electric contact group.

10. The imaging apparatus according to claim 1, wherein the plurality of electric contacts includes, disposed on an opposite side of the first electric contact group from the second electric contact group:
an electric contact configured to be used to determine whether or not the lens apparatus is mounted to the imaging apparatus,
an electric contact configured to be used to determine a type of lens apparatus mounted to the imaging apparatus, and
an electric contact configured to set a ground level of the second power supplied from the second power contact.

11. The imaging apparatus according to claim 1,
wherein the imaging apparatus is configured to mount any one of lens apparatuses including a first lens apparatus and a second lens apparatus,
wherein the imaging apparatus is configured communicate using the first electric contact group with both of the first lens apparatus and the second lens apparatus, and
wherein the imaging apparatus is configured communicate using the second electric contact group with the second lens apparatus but is configured not to communicate using the second electric contact group with the first lens apparatus.

12. The imaging apparatus according to claim 11, wherein the first lens apparatus is configured to be mounted to the imaging apparatus only via an intermediate accessory.

13. The imaging apparatus according to claim 1, wherein the plurality of electric contacts includes an electric contact configured to be used to determine whether or not the lens apparatus is mounted to the imaging apparatus, at a location on the same tier with the first electric contact group and opposite from the second electric contact group in between the first electric contact group.

14. The imaging apparatus according to claim 1, wherein the plurality of electric contacts includes an electric contact configured to be used to determine a type of lens apparatus mounted to the imaging apparatus at a location on the same tier with the first power contact and the second power contact.

15. An accessory detachably mountable to an imaging apparatus, the accessory comprising:

a mount unit; and a contact holding member provided to the mount unit where a plurality of electric contacts of the accessory are arrayed, wherein the plurality of electric contacts of the accessory includes:

a first power contact configured to receive first power, a second power contact configured to receive second power, a third electric contact group configured to be used for first communication, and a fourth electric contact group configured to be used for communication that is different from the first communication, wherein the third electric contact group consists of:

a fourth electric contact configured to receive a clock signal, a fifth electric contact configured to receive data transmitted synchronously with the clock signal, and a sixth electric contact configured to transmit data synchronously with the clock signal, wherein the contact holding member has two tiers each of which holds electric contacts included in the plurality of electric contacts of the accessory, wherein the third electric contact group is held on one of the two tiers and the first power contact and the second power contact are held on the other of the two tiers, wherein, where a direction of rotation of the accessory when mounting the accessory is a first direction, the third electric contact group, the fourth electric contact group, the first power contact, and the second power contact are arrayed in the following order: the fourth electric contact group, the third electric contact group, the second power contact, and the first power contact in the first direction, and wherein the fifth electric contact and the sixth electric contact are disposed on an opposite side of the fourth electric contact group with respect to the fourth electric contact.

16. The accessory according to claim 15, wherein the plurality of electric contacts of the accessory includes:

an electric contact used for indicating that a lens apparatus is mounted to the imaging apparatus at a location on the same tier with the third electric contact group, and an electric contact used for indicating a type of a mounted lens apparatus at a location on the same tier with the first power contact and the second power contact.

17. The accessory according to claim 15, wherein the accessory is a lens apparatus having an optical system.

18. The accessory according to claim 15, wherein the accessory is an intermediate accessory detachably mountable between the imaging apparatus and a lens apparatus.

19. A camera system comprising:

an imaging apparatus; and an accessory configured to be detachably mountable to the imaging apparatus, wherein the imaging apparatus includes a plurality of electric contacts, a first mount unit, and a contact holding member provided to the first mount unit where the plurality of electric contacts of the imaging apparatus are arrayed, wherein the plurality of electric contacts of the imaging apparatus includes:

a first power contact configured to supply first power, a second power contact configured to supply second power, a first electric contact group configured to be used for first communication with at least one accessory mounted to the imaging apparatus, and a second electric contact group consisting of 2 electric contacts and configured to be used for communication with at least one accessory mounted to the imaging apparatus, wherein the communication using the second electric contact group is different from the first communication, wherein the first electric contact group consists of:

a first electric contact configured to output a clock signal, a second electric contact configured to transmit data synchronously with the clock signal, and a third electric contact configured to receive data transmitted synchronously with the clock signal, wherein the contact holding member has two tiers each of which holds electric contacts included in the plurality of electric contacts of the imaging apparatus, wherein the first electric contact group and the second electric contact group are held on one of the two tiers and the first power contact and the second power contact are held on the other of the two tiers, wherein the accessory includes a plurality of electric contacts arrayed in a second mount unit configured to couple with the first mount unit, wherein the plurality of electric contacts of the accessory includes:

a third electric contact group made up of electric contacts that come into contact with electric contacts included in the first electric contact group in a state where the accessory is mounted to the imaging apparatus directly, wherein, where a direction of rotation of a lens apparatus with respect to the imaging apparatus when mounting the lens apparatus to the imaging apparatus directly is a first direction, the second electric contact group, the first electric contact group, the first power contact, and the second power contact are arrayed in the following order: the second electric contact group, the first electric contact group, the second power contact, and the first power contact in the first direction, and wherein the second electric contact and the third electric contact are disposed on an opposite side of the second electric contact group with respect to the first electric contact.

20. The camera system according to claim 19, wherein the imaging apparatus is configured to mount any one of lens apparatuses including a first lens apparatus and a second lens apparatus, wherein the imaging apparatus is configured to communicate using the first electric contact group with both of the first lens apparatus and the second lens apparatus, and wherein the imaging apparatus is configured to communicate using the second electric contact group with the second lens apparatus but is configured not to communicate using the second electric contact group with the first lens apparatus.

* * * * *